US007712042B2

(12) United States Patent
Hernandez-Sherrington et al.

(10) Patent No.: US 7,712,042 B2
(45) Date of Patent: May 4, 2010

(54) TECHNIQUES FOR VIEWING MAPPINGS AND NODES

(75) Inventors: Mauricio Antonio Hernandez-Sherrington, Gilroy, CA (US); Robert LaVerne Hobbs, Saratoga, CA (US); Kiranmayi Potu, Cupertino, CA (US); Daina Edvina Pupons Wickham, Morgan Hill, CA (US); Lingling Yan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 11/149,754

(22) Filed: Jun. 10, 2005

(65) Prior Publication Data

US 2006/0282454 A1 Dec. 14, 2006

(51) Int. Cl.
*G06F 3/048* (2006.01)
(52) U.S. Cl. .................. 715/781; 715/854; 715/713
(58) Field of Classification Search ........... 715/781, 715/712, 713, 771, 805, 806, 807; 707/102
See application file for complete search history.

(56) References Cited

U.S. PATENT DOCUMENTS

| | | |
|---|---|---|
| 5,295,261 A | 3/1994 | Simonetti |
| 5,530,957 A | 6/1996 | Koenig |
| 5,627,979 A | 5/1997 | Chang et al. |
| 5,802,514 A | 9/1998 | Huber |
| 5,812,135 A | 9/1998 | Kotchey |
| 5,895,474 A | 4/1999 | Maarek et al. |
| 5,907,706 A | 5/1999 | Brodsky et al. |
| 5,966,139 A | 10/1999 | Anupam et al. |
| 6,055,515 A | 4/2000 | Consentino et al. |
| 6,175,837 B1 | 1/2001 | Sharma et al. |
| 6,279,008 B1 | 8/2001 | Tung Ng et al. |

(Continued)

OTHER PUBLICATIONS

Baer, T., "Can Process Control Do Windows?", *Managing Automation*, vol. 8, No. 2, Feb. 1993, pp. 51-52.

(Continued)

*Primary Examiner*—Steven P Sax
*Assistant Examiner*—Andres E Gutierrez
(74) *Attorney, Agent, or Firm*—Janaki K. Davda; Konrad Raynes & Victor LLP

(57) ABSTRACT

Techniques are provided for viewing mappings between objects. A main view is displayed, wherein the main view shows one or more source objects, one or more target objects, and zero or more mappings between the one or more source objects and the one or more target objects. Input selecting a type of view to be displayed in the main view is received, wherein each type of view provides a different amount of detail regarding the mappings. In response to receiving the input, the selected type of view is created, and the created view is displayed.

Additionally, techniques are provided for viewing objects. One or more objects along with mappings between the one or more objects are displayed. View filters are provided that may be applied to the one or more objects, wherein the view filters enable hiding at least one of mapped or unmapped objects.

Moreover, techniques are provided for viewing nodes. A structure is displayed that includes one or more nodes. A hide option is provided that may be applied to the one or more displayed nodes, wherein selection of the hide option hides one or more selected nodes of the displayed nodes and descendants of the selected nodes.

30 Claims, 20 Drawing Sheets

U.S. PATENT DOCUMENTS

| | | | |
|---|---|---|---|
| 6,564,368 B1* | 5/2003 | Beckett et al. | 717/113 |
| 6,816,175 B1 | 11/2004 | Hamp et al. | |
| 6,823,495 B1* | 11/2004 | Vedula et al. | 715/805 |
| 2002/0013834 A1* | 1/2002 | Esakov et al. | 709/223 |
| 2002/0178433 A1 | 11/2002 | Hodgson et al. | |
| 2003/0097369 A1 | 5/2003 | McKnight et al. | |
| 2004/0117392 A1 | 6/2004 | Burgmeier | |
| 2004/0128300 A1 | 7/2004 | Fong et al. | |
| 2005/0021513 A1 | 1/2005 | Vedula et al. | |

OTHER PUBLICATIONS

Colyer, A.M., J. Diedrichsen, M. Slade, & M.G. Taylor, "Displaying and Manipulating Relationships", IBM TDB v38, n12, Dec. 1995, pp. 391-396.

Dugan, R.F., "Heirarchical Data Model for a Relational Database Based Geographic Information System", Disclosure K18910178, TDB v40, n3, Mar. 1997, p. 107-116.

Larner, A., "Physical Views of Logical Data", Disclosure UK8890205, TDB n4a, Sep. 1991, pp. 393-397.

Schmitzl, A., "Tree Navigator- A Concept for Navigation in Big Trees", Disclosure DE820010040, RD n448, Article 109, Aug. 2001, p. 1384.

Smith, L.C., "Level Management of Connections and Objects in a Visual Constructor", IBM TDB v39, n3, Mar. 1996, pp. 161-162.

U.S. Appl. No. 10/906,785, filed Mar. 7, 2005, entitled "System, Method and Program Product for Setting and Managing Breakpoints in a Data Schema Mapping Editor", invented by S. Tan.

U.S. Appl. No. 11/034,951, filed Jan. 13, 2005, entitled "Method and System for Automatically Hiding Irrelevant Parts of Hierarchical Structures in Computer User Interfaces", inventerd by I. Simmonds, S. Abrams, & J. Vlissides.

U.S. Appl. No. 11/042,391, filed Jan. 24, 2005, entitled "Viewing and Editing Markup Language Files with Complex Semantics", invented by A. Goldin, R. Emek, & L. Wettzman.

* cited by examiner

TECHNIQUES FOR VIEWING MAPPINGS AND NODES

BACKGROUND

1. Field

Embodiments of the invention relate to techniques for viewing mappings and nodes.

2. Description of the Related Art

Some conventional systems enable a user to map columns of one table to columns of another table (i.e., to form mappings between columns). A mapping may be described as a relationship between two objects. The mappings between columns that the user creates may be partitioned into one or more mapping groups based on some grouping criteria. It is possible for there to be a large number of mappings (e.g., in the hundreds) of columns. The mappings may be shown on a display screen of a computer monitor, for example, by illustrating the tables and their columns and drawing lines between mapped columns. Displaying the mappings on a typical display screen may be difficult. In particular, as the number of mappings increases, it may be difficult to illustrate all of the mappings on the workspace of the screen. This is a scalability of workspace issue. Workspace may be described as a portion of the screen that is used to perform a task or to display information related to one or more tasks. Some conventional systems enable a user to scroll (e.g., using a scroll bar) to different portions of the mappings because all of the mappings can not be displayed on the display screen at one time. When a large amount of data is involved the user must repeatedly scroll the data to find the desired information, which may be time consuming and which may not provide a clear indication of the mappings.

When the user is dealing with a large number of objects (e.g., tables, views, etc.) and a large number of columns per table, it may be difficult for the user to get a good sense of the progress that has been made in creating the mappings and it may be difficult to view the individual mappings (e.g., lines representing mappings (also referred to as mapping lines) may cross each other or go off the display screen). Additionally, display of many of the lines may not be needed at a given time, and the extra processing time required to draw these unneeded lines may adversely impact system performance in conventional systems.

Some conventional systems may use a flow chart approach to illustrate the mappings, but it is often difficult to see a large number of columns at once. Some conventional systems use a single view approach to illustrate the mappings. The single view approach may work well for a small number of mappings, but when a large number of mappings are involved, the information will not fit in the workspace, and the user has to scroll the workspace to find mappings of interest.

Some conventional systems provide a hierarchical structure (e.g., a tree type structure). It is very difficult to focus on, or even view, information of interest when a large amount of hierarchical or tree data is being displayed. Tree structures generally provide controls for collapsing and expanding nodes and their children, but even in their collapsed state, the nodes each occupy a row of space. Thus, some conventional systems provide hide/show functions by enabling a user to manually select each branch of the tree type structure that is to be further shown or hidden, but these functions may be tedious to use.

Some conventional systems allow the user to hide or collapse objects that they are not interested in. This may be very tedious if there are many objects (e.g., hundreds of tables) and the user only wants to view one or two of the objects. Also, some conventional systems allow the user to launch a separate dialog window and type in a filter to show desired objects. However, this requires the user to find common criteria within the limits of the filter for the objects to be shown, which may be difficult.

Thus, there is a need in the art for improved techniques for viewing mappings and nodes.

SUMMARY

Provided are a method, article of manufacture, and system for viewing mappings between objects. A main view is displayed, wherein the main view shows one or more source objects, one or more target objects, and one or more mappings between the one or more source objects and the one or more target objects. Input is received that selects a type of view to be displayed in the main view, wherein each type of view provides a different amount of detail regarding the mappings. In response to receiving the input, the selected type of view is created, and the created view is displayed.

Also provided are a method, article of manufacture, and system for viewing objects. One or more objects along with mappings between the one or more objects are displayed. View filters are provided that may be applied to the one or more objects, wherein the view filters enable hiding at least one of mapped or unmapped objects.

Moreover, provided are a method, article of manufacture, and system for viewing nodes. A structure is displayed that includes one or more nodes. A hide option is provided that may be applied to the one or more displayed nodes, wherein selection of the hide option hides one or more selected nodes of the displayed nodes and descendants of the selected nodes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments of the invention.

Figure 1:
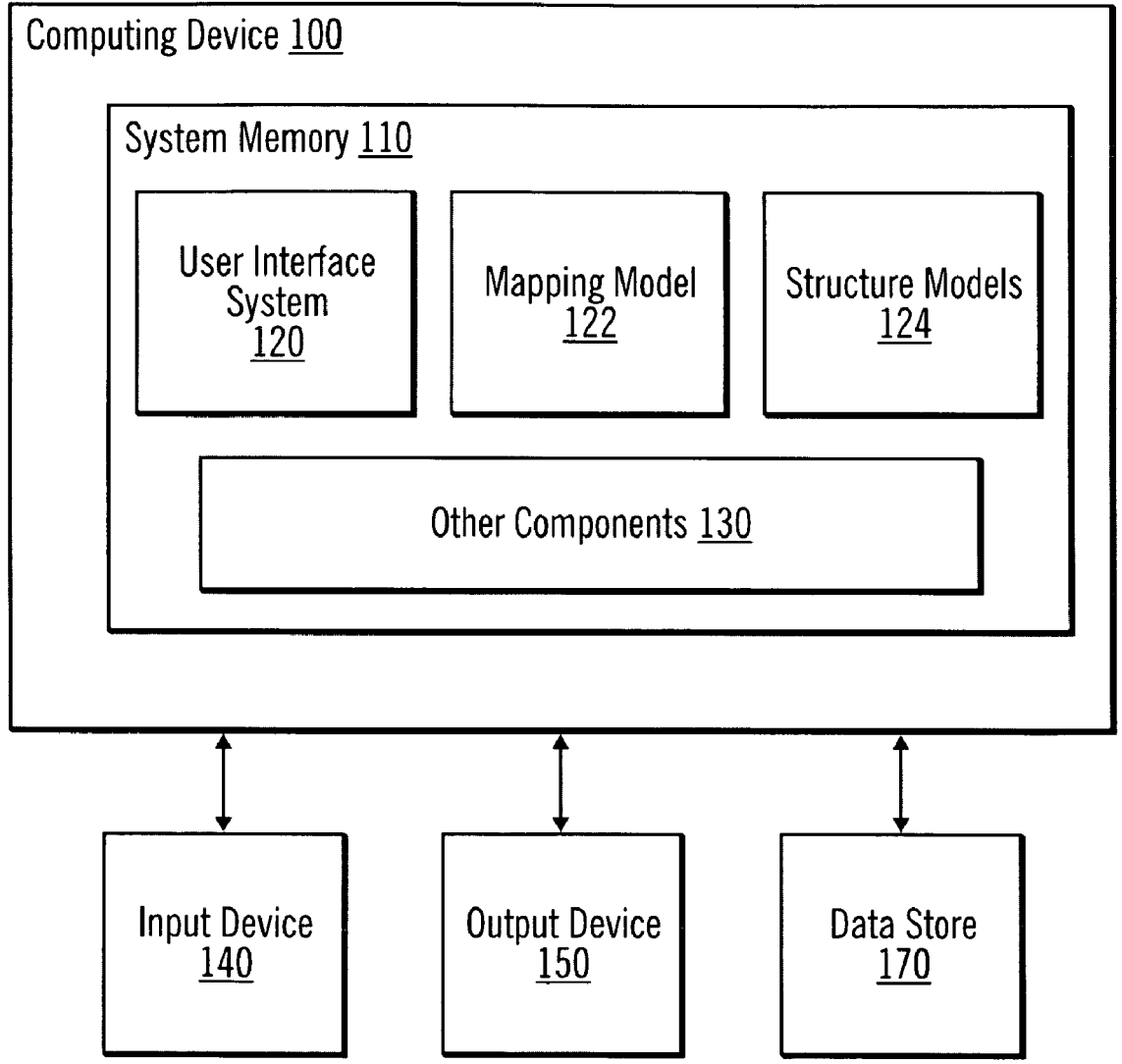
FIG. 1 illustrates details of a computer architecture in which certain embodiments may be implemented.

FIG. 1 illustrates details of a computer architecture in accordance with certain embodiments. A computing device 100 includes system memory 110, which may be implemented in volatile and/or non-volatile devices. A user interface system 120, a mapping model 122, and structure models 124 are stored in the system memory 104 for execution by a processor (e.g., a Central Processing Unit (CPU)) (not shown). System memory 110 may also store other components 130. The user interface system 120 provides a Graphical User Interface (GUI) to enable a user to view and modify mappings between objects, to view mapped or unmapped objects, and to view nodes of structures.

The mapping model 122 may be described as including information on source objects and target objects and mappings between the source objects and target objects (e.g., information that indicates that a first column of a first table is mapped to a second column of a second table). Further, the mapping model 122 includes information that associates the mappings with mapping groups. Also, the mapping model 122 includes references to information in the structure models 124. The mappings that are stored in the mapping model 122 may be created in various manners. In certain embodiments, the user interface system 120 may be used to create mapping groups and column mappings (e.g., by a user). In certain embodiments, the user interface system 120 may generate the mapping groups and column mappings. The structure models 124 store structure information. There may be one structure model 124 for source objects and another structure model 124 for target objects.

The computing device 100 is coupled to an input device 140, an output device 150, and a data store 170. One or more mapping models may also be stored in the data store 170.

The user interface system 120 uses the mapping models 122 to generate various views (i.e., overview, detail view, and single mapping group view) that are displayed, such as those shown in FIGS. 2-5.

In alternative embodiments, the user interface system 120 is a computer program that may be implemented as hardware, software, or a combination of hardware and software.

The computing device 100 may comprise any computing device known in the art, such as a server, mainframe, workstation, personal computer, hand held computer, laptop telephony device, network appliance, etc.

The data store 170 may comprise an array of storage devices, such as Direct Access Storage Devices (DASDs), Just a Bunch of Disks (JBOD), Redundant Array of Independent Disks (RAID), virtualization device, etc.

Examples herein may refer to tables and columns, but embodiments of the invention are applicable to various objects that may be mapped, such as nodes of structures.

The user interface system 120 enables a main view to be viewed in the format of the following types of views: overview, detail, and single group mapping. Each type of view provides a different amount of detail regarding the mappings. The overview shows mappings between objects that comprise mapping groups (i.e., a group of related mappings). A mapping group may be described as including source objects and target objects, as well as mappings between those objects. In certain embodiments, the objects are tables, and in such embodiments a mapping group may be described as including source tables and target tables, as well as column mappings between columns of those tables. Column mappings of a mapping group may be described as mappings between source columns of source tables and target columns of target tables contained in that mapping group. In certain embodiments, the detail view shows detailed mappings (e.g., column mappings) contained in all of the mapping groups. In certain alternative embodiments, there may be multiple detail views, where each detail view shows detailed mappings contained in some specified set of mapping groups. The single mapping group view shows mappings (e.g., column mappings) contained within a single mapping group. In embodiments in which the objects are tables with columns, the single mapping group view enables a user to select and work on individual column to column mappings within the tables contained within a selected mapping group. This is especially useful if the individual tables are large and/or the individual tables are highly separated alphabetically so that it would be hard to view them on a single screen in the overview and detail views. In various embodiments, different techniques may be used in the different views to identify which view is being displayed (e.g., colored lines, different types of lines or text or graphics associated with the lines) in addition to or instead of identifying the title of the type of view in the main view.

In certain embodiments, the main view includes three areas: a source area, a middle area, and a target area. In certain embodiments, each of the three areas is independently scrollable (e.g., a user may use a separate scroll bar to scroll through portions of each area). The user interface system 120 uses the mapping model 122 to generate mappings shown in the main view and uses structure models 124 to generate structures shown in the source area 210 and target area 230.

A hierarchical structure is composed of nodes that are related to each other. The top-most node is called a root node, and the root node is the only node that has no parent. A node may have one or more child nodes, also referred to as children, and the node is said to be a parent of the child nodes. Nodes without child nodes are called leaf nodes. Ancestor nodes may be described as the nodes between a particular node and the root node. Descendant nodes of a particular node may be described as the nodes which have that particular node as an ancestor node.

Figure 2:
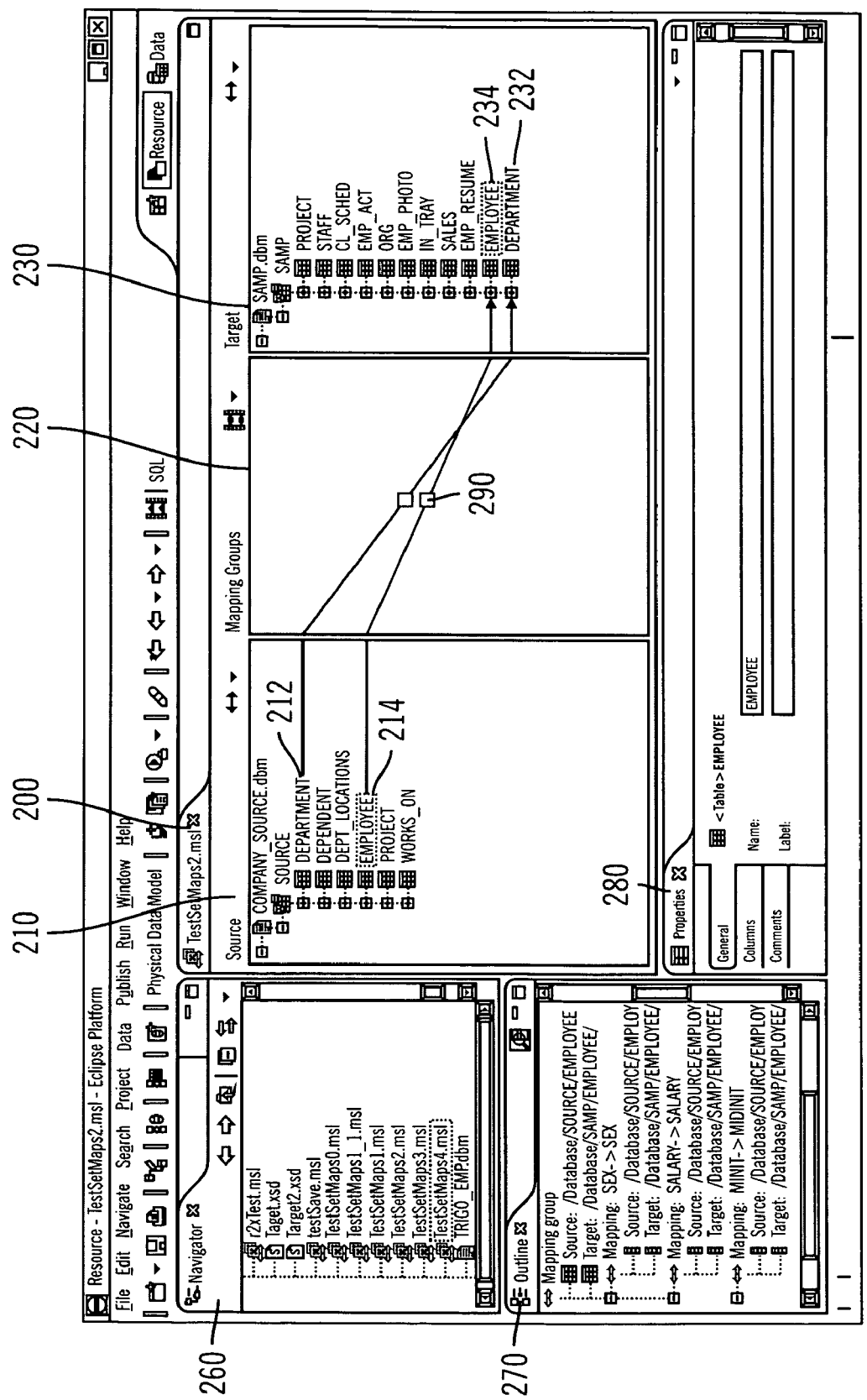
FIG. 2 illustrates a main view that displays an overview in accordance with certain embodiments.

FIG. 2 illustrates a main view 200 that displays an overview in accordance with certain embodiments. The main view 200 includes three areas: a source area 210, a middle area 220, and a target area 230. The user interface system 120 uses the mapping model 122 to generate the mappings shown in the main view 200 and uses structure models 124 to generate structures shown in the source area 210 and target area 230. The main view may be switched between an overview, a detail view, and a single mapping group view, and the type of view being displayed is shown in the middle area 220. In the example of FIG. 2, the main view 200 provides an overview, and merely as an example, the term "Mapping Groups" in the middle area 220 is used to indicate that this is an overview.

The overview illustrates higher-level mappings. The higher-level mappings may be from one or more source tables to one or more target tables (e.g., multiple source table to multiple target table mappings or single source table to single target table mappings). For example, in the overview 200, Department table 212 from the source area 210 is related to Department table 232 from the target area 230. Also, the Employee table 214 from the source area 210 is related to the Employee table 234 from the target area.

In certain embodiments, the main view may be displayed along with a navigator view 260, an outline view 270, and/or a properties view 280. In particular, the user interface system 120 may display a navigator view 260 that lists files available at the computing device 100, an outline view 270 that provides textual information about mappings (e.g., Source:/Database/SOURCE/EMPLOYEE is mapped to Target:/Database/SAMP/EMPLOYEE), and a properties view 280 that provides information about a currently selected object (e.g., the Employee table 214 is selected in this example).

Figure 3:
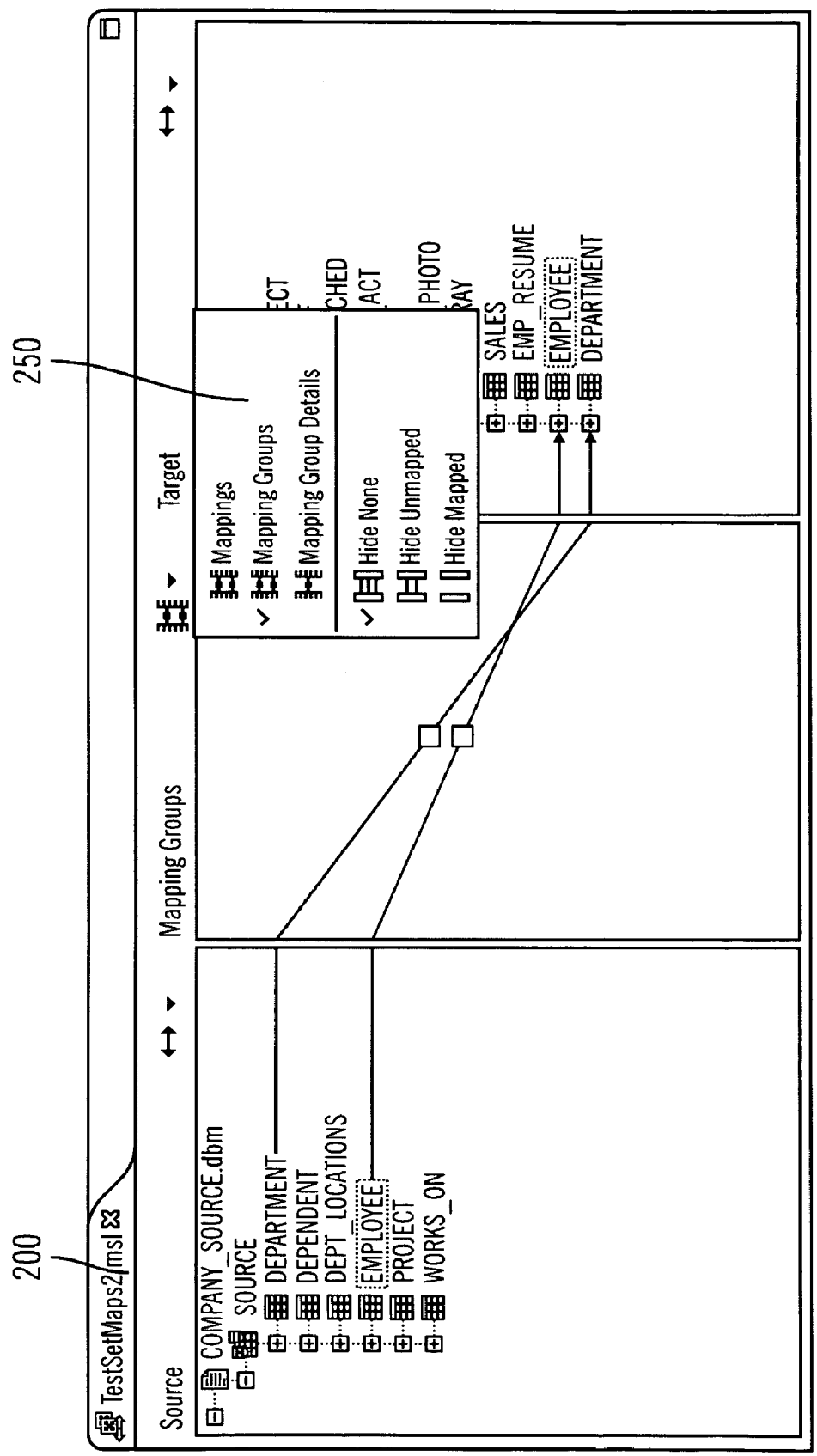
FIG. 3 illustrates a pulldown menu for switching between the overview, detail, and single mapping group views in accordance with certain embodiments.
Figure 4:
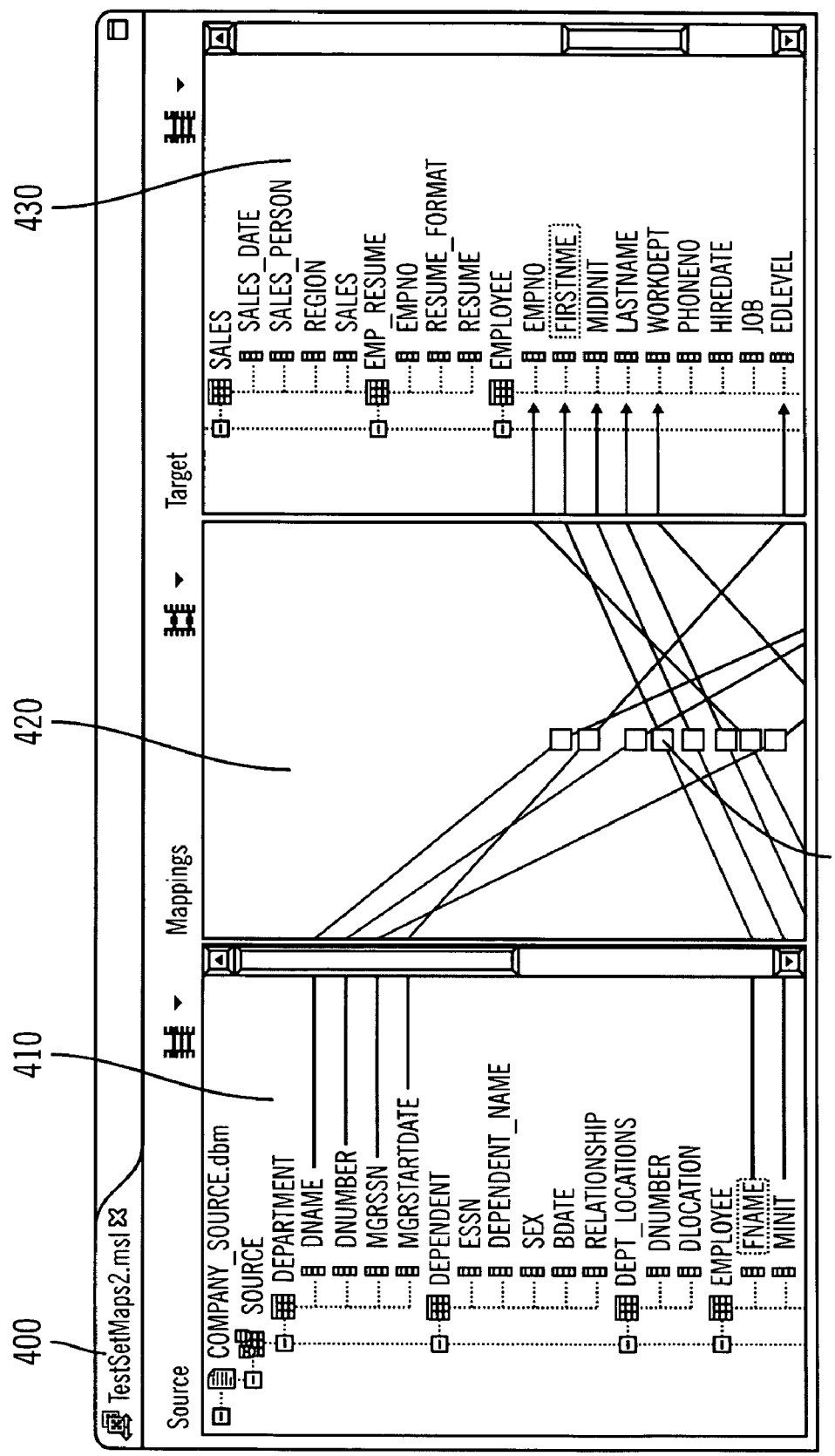
FIG. 4 illustrates a main view that displays a detail view in accordance with certain embodiments.
Figure 5:
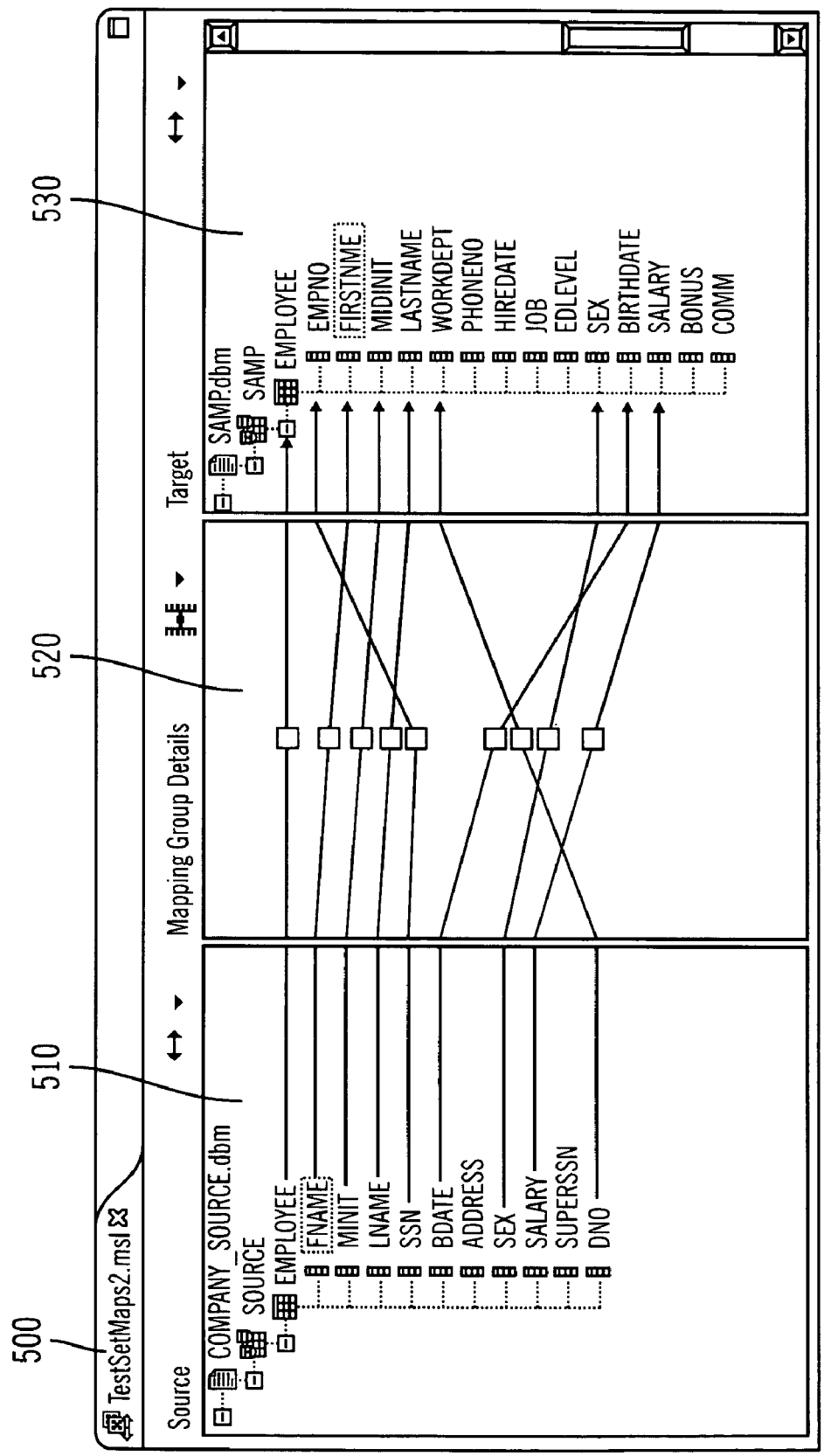
FIG. 5 illustrates a main view that displays a single mapping group view in accordance with certain embodiments.

From the overview, a user may switch to the detail view (of FIG. 4) or the single mapping group view (of FIG. 5). In certain embodiments, the user switches between views by using a pull-down menu. In certain alternative embodiments, the user switches between views by selecting a tab associated with a desired view (where each of the views appears as a tab on the display screen). In yet other alternative embodiments, the user switches between views by pressing a button associated with a desired view. In other alternative embodiments, a popup menu may be used to switch between the three views. FIG. 3 illustrates a pulldown menu 250 for switching between the overview, detail, and single mapping group views in accordance with certain embodiments. The pulldown menu 250 has the options of Mappings (i.e., detail view), Mapping Groups (i.e., overview) or Mapping Group Details (i.e., single mapping group view).

With reference to FIG. 2, in the middle area 220, squares are displayed to represent mappings. When the main view 200 displays the overview, a user may select a mapping (e.g., by selecting a square representing a mapping between tables) and then select the single mapping group view from the pulldown menu 520 to switch to the single mapping group view. Each hub (e.g., hub 290) represents a single mapping group. For example, if hub 290 is selected, the single mapping group view shows the mapping between the Employee table 214 and the Employee table 234.

FIG. 4 illustrates a main view 400 that displays a detail view in accordance with certain embodiments. The main view 400 includes three areas: a source area 410, a middle area 420, and a target area 430. In the example of FIG. 4, the main view 400 provides a detail view, and merely as an example, the term "Mappings" in the middle area 420 is used to indicate that this is a detail view.

In certain embodiments, the detail view is a default view. In other embodiments, the overview or single group mapping may be the default view. In certain embodiments, a user may be able to use the detail view to create and view simple mappings (e.g., a few tables), without using the overview or single mapping group views.

From the detail view, a user may switch to the overview or the single mapping group view (of FIG. 5). In certain embodiments, the user switches between views by using a pull-down menu (e.g., pull-down menu 250). In certain alternative embodiments, the user switches between views by selecting a tab associated with a desired view (where each of the views appears as a tab on the display screen). In yet other alternative embodiments, the user switches between views by pressing a button associated with a desired view. In other alternative embodiments, a popup menu may be used to switch between the three views.

When the main view 400 displays the detail view, a user may select a column mapping (e.g., by selecting a square representing a column mapping) and then select the single mapping group view from the pulldown menu 520 to switch to the single mapping group view containing the selected column mapping. For example, if mapping 490 is selected, the single mapping group view shows the mapping between the Employee table 214 and the Employee table 234.

FIG. 5 illustrates a main view 500 that displays a single mapping group view in accordance with certain embodiments. The main view 500 includes three areas: a source area 510, a middle area 520, and a target area 530. In the example of FIG. 5, the main view 500 provides a single mapping group view, and merely as an example, the term "Mapping Group Details" in the middle area 520 is used to indicate that this is a single mapping group view. A user may select a single mapping group and work on the selected mapping in the single mapping group view. The selected mapping group is shown, while the user interface system 120 clears the workspace of other objects and mappings. However, as the user may want to focus in on another mapping group after finishing this one, the user interface system 120 enables the user to do so by going to the overview and selecting a different mapping group or going to the detail view and selecting a column mapping and then returning to the single mapping group view. Thus, by simply switching to the overview or detail view, selecting a mapping, and returning to the single mapping group view, just the mapping of interest is shown, while other mappings are hidden. The hidden mappings remain in the mapping model 122, but are not displayed on the output device 150. With the single mapping group view, the user is able to see which columns from source tables map to target tables in that mapping group and is able to adjust those mappings and add new ones.

From the single mapping group view, a user may switch to the overview or the detail view. In certain embodiments, the user switches between views by using a pull-down menu (e.g., pull-down menu 250). In certain alternative embodiments, the user switches between views by selecting a tab associated with a desired view (where each of the views appears as a tab on the display screen). In yet other alternative embodiments, the user switches between views by pressing a button associated with a desired view. In other alternative embodiments, a popup menu may be used to switch between the three views.

Figure 6:
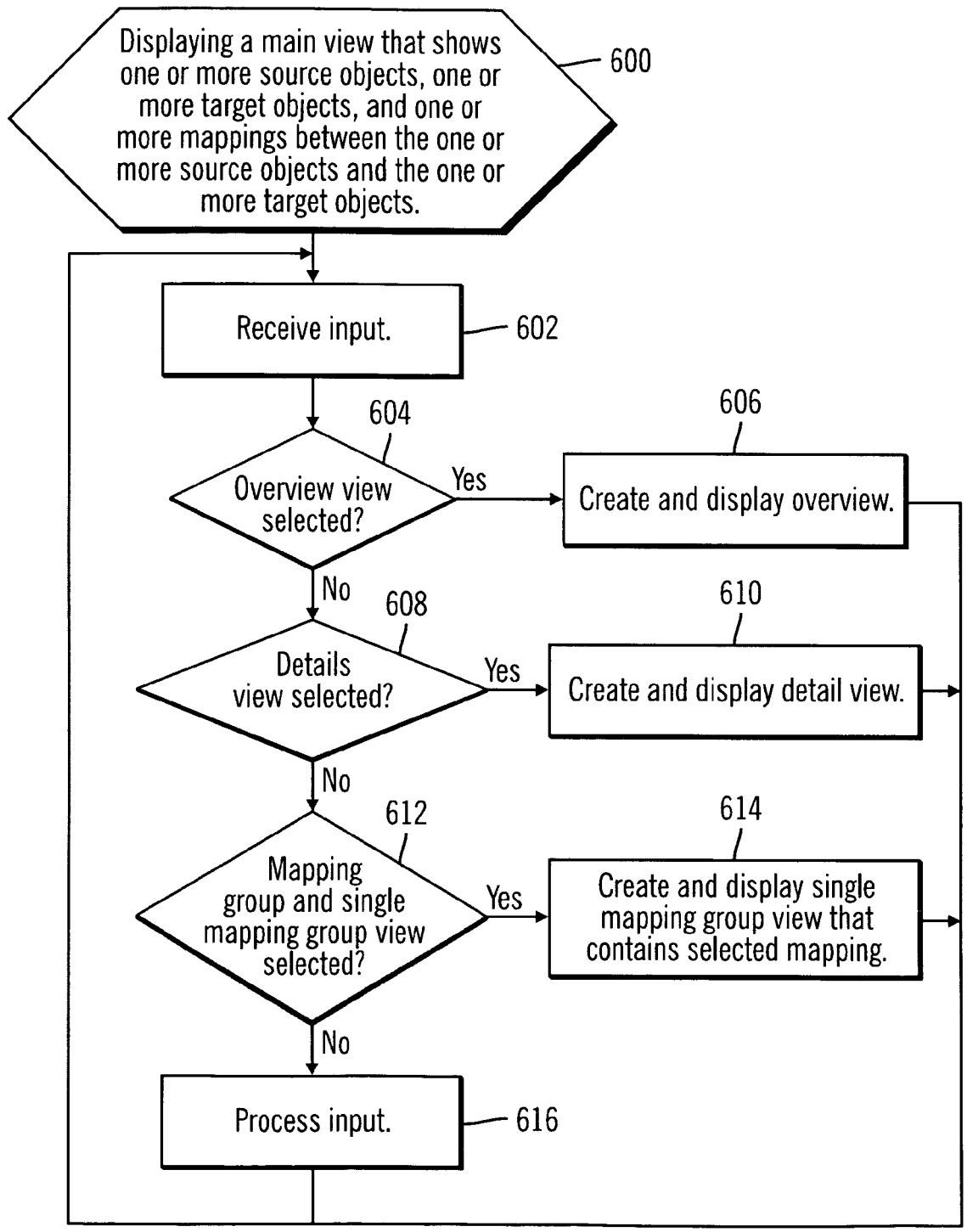
FIG. 6 illustrates logic performed by a user interface system for providing multiple views in accordance with certain embodiments.

FIG. 6 illustrates logic performed by the user interface system 120 for providing multiple views in accordance with certain embodiments. Control begins at block 600 with the user interface system 120 displaying a main view that shows one or more source objects, one or more target objects, and one or more mappings between the one or more source objects and the one or more target objects. In certain embodiments, the main view includes a source area, a middle area, and a target area. The source area includes the one or more source objects, the target area includes the one or more target objects, and the middle area includes an indication of whether there are any mappings between the one or more source objects and the one or more target objects. In block 602, the user interface system 120 receives input. For example, the input may select a type of view (e.g., overview, detail view or single mapping group view) to be displayed in the main view, wherein each type of view provides a different amount of detail regarding the mappings. Then, in response to receiving the input, the type of view selected is displayed by the user interface system 120 (blocks 604-614).

In block 604, the user interface system 120 determines whether the input indicates that the overview has been selected. If so, processing continues to block 606, otherwise, processing continues to block 608. In block 606, the user interface system 120 creates and displays the overview and processing loops back to block 602. In particular, the user interface system 120 obtains information about mapping groups from the mapping model 122 and uses this information to create and display the overview. In certain embodiments, the mapping model 122 references information in the structure models 124, and the user interface system 120 also uses this information to create and display the overview.

In block 608, the user interface system 120 determines whether the input indicates that the detail view has been selected. If so, processing continues to block 610, otherwise, processing continues to block 612. In block 610, the user interface system 120 creates and displays the detail view and processing loops back to block 602. In particular, the user interface system 120 obtains information about more detailed mappings (e.g., column mappings) and uses this information to create and display the details view. In certain embodiments, the mapping model 122 references information in the structure models 124, and the user interface system 120 also uses this information to create and display the detail view.

In block 612, the user interface system 120 determines whether the input indicates that a mapping group (e.g., a table mapping or a column mapping) and the single mapping group view have been selected. If so, processing continues to block 614, otherwise, processing continues to block 616. In block 614, the user interface system 120 creates and displays the single mapping group view that contains the selected mapping group and processing loops back to block 602. In particular, the user interface system 120 obtains information about the selected single mapping group from the mapping model and uses this information to create and display the single mapping group view. In certain embodiments, the mapping model 122 references information in the structure models 124, and the user interface system 120 also uses this information to create and display the single mapping group view.

In block 618, the user interface system 120 processes the input and processing loops back to block 602.

Embodiments provide filtering of mapped and unmapped objects. In particular, during the process of mapping information from a source object (e.g., a database, schema, tree or table) to a target object (e.g., a database, schema, tree or table), it is often useful to be able to focus on objects that have not yet been mapped, or alternatively, to focus on objects that have already been mapped. Also, after desired objects have been mapped, it may be useful to be able to hide the unmapped objects that were not needed, in order to focus on the objects of interest. The hidden objects and mapping information (e.g., lines) remain in the mapping model 122 and in the structure models 124, but are not displayed on the output device 150. The objects, such as tables, may be considered to be nodes of a structure.

Thus, the user interface system 120 provides selectable view filters (e.g., as menu options) that enable a user to choose to show mapped and unmapped objects, to hide mapped objects or to hide unmapped objects. This allows the user to focus on data of interest and reduces or eliminates the need to scroll the data.

The user interface system 120 provides the following view filters: hide none, hide mapped, and hide unmapped. In certain embodiments, the view filters provided by the user interface system 120 may apply to columns (i.e., which are schema leaf level nodes) or tables (i.e., which are parents of schema leaf level nodes). A schema may be described as a collection of objects that have a hierarchical structure. In certain embodiments, the view filters may be applied at the table level. In such embodiments, a mapped table may be described as a table in which all columns are mapped, while an unmapped table may be described as a table in which no columns are mapped. In alternative embodiments, the view filters may be applied at the column level. In such alternative embodiments, a mapped column may be described as a column that is mapped to one or more columns, while an unmapped column may be described as a column that is not mapped to another column. In yet other embodiments, the view filters may be applied to mappings of other objects.

Figure 7:
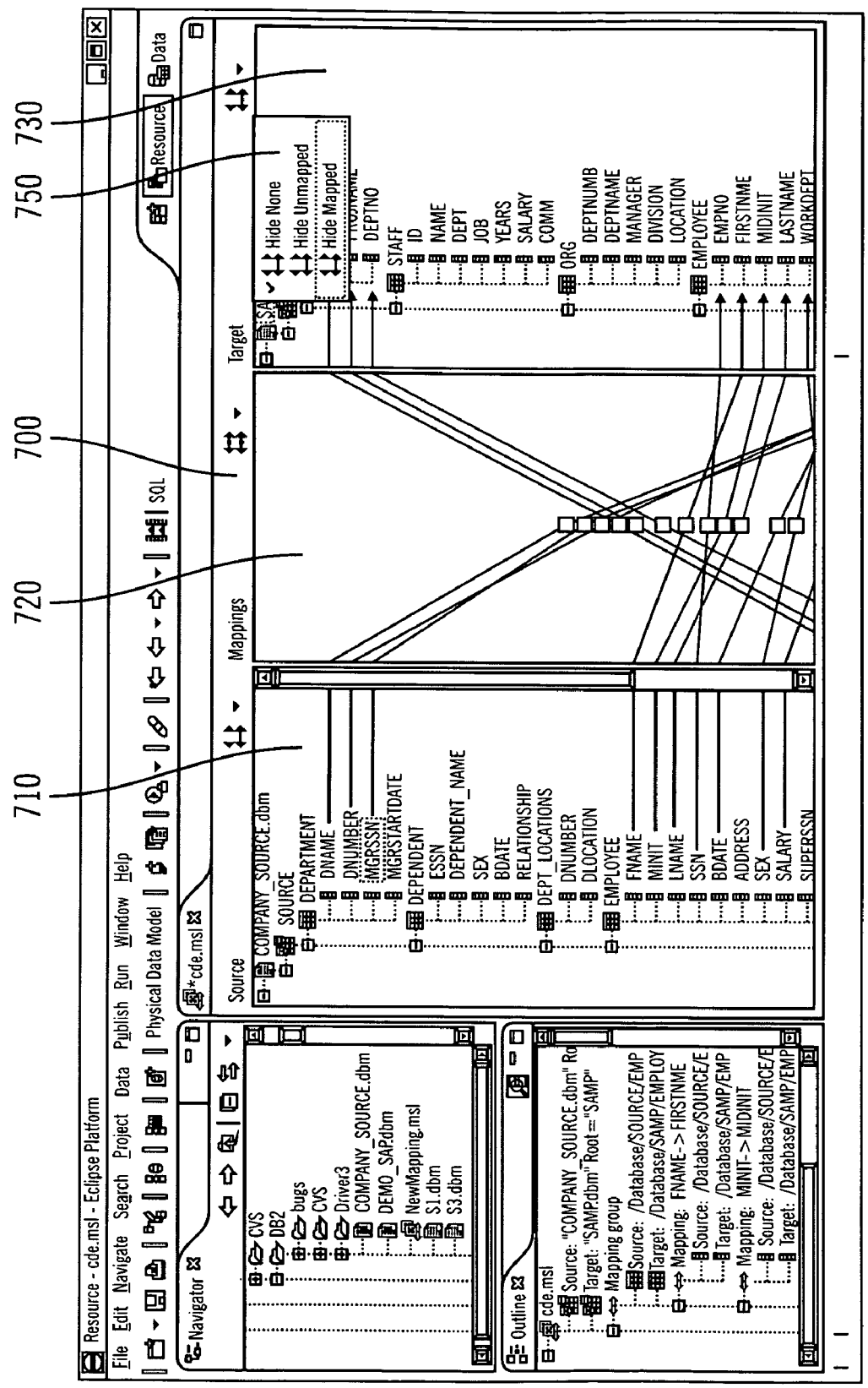
FIG. 7 illustrates a main view in which a hide mapped view filter has been selected in accordance with certain embodiments.

In the examples of FIGS. 7-10, the source and target objects are database tables and columns represented by source and target schemas. FIG. 7 illustrates a main view 700 in which a hide mapped view filter has been selected in accordance with certain embodiments. The main view 700 includes three areas: a source area 710, a middle area 720, and a target area 730. Although the main view 700 illustrates a detail view, in alternative embodiments, the main view 700 may illustrate an overview or a single mapping group view. The view filters are available in each of the three views 710, 720, 730 of the main view 700. When a view filter is selected from the middle area 720, the user interface system 120 applies the view filter to both the source and the target areas. When selected from the source area 710 or target area 730, the selected view filter is applied by the user interface system 120 to the respective source or target area. A view filter pulldown menu 750 includes the view filters of: hide none, hide unmapped, and hide mapped. Initially, the "Hide None" view filter is shown as being selected, so both mapped and unmapped tables are shown in the main view 700.

Figure 8:
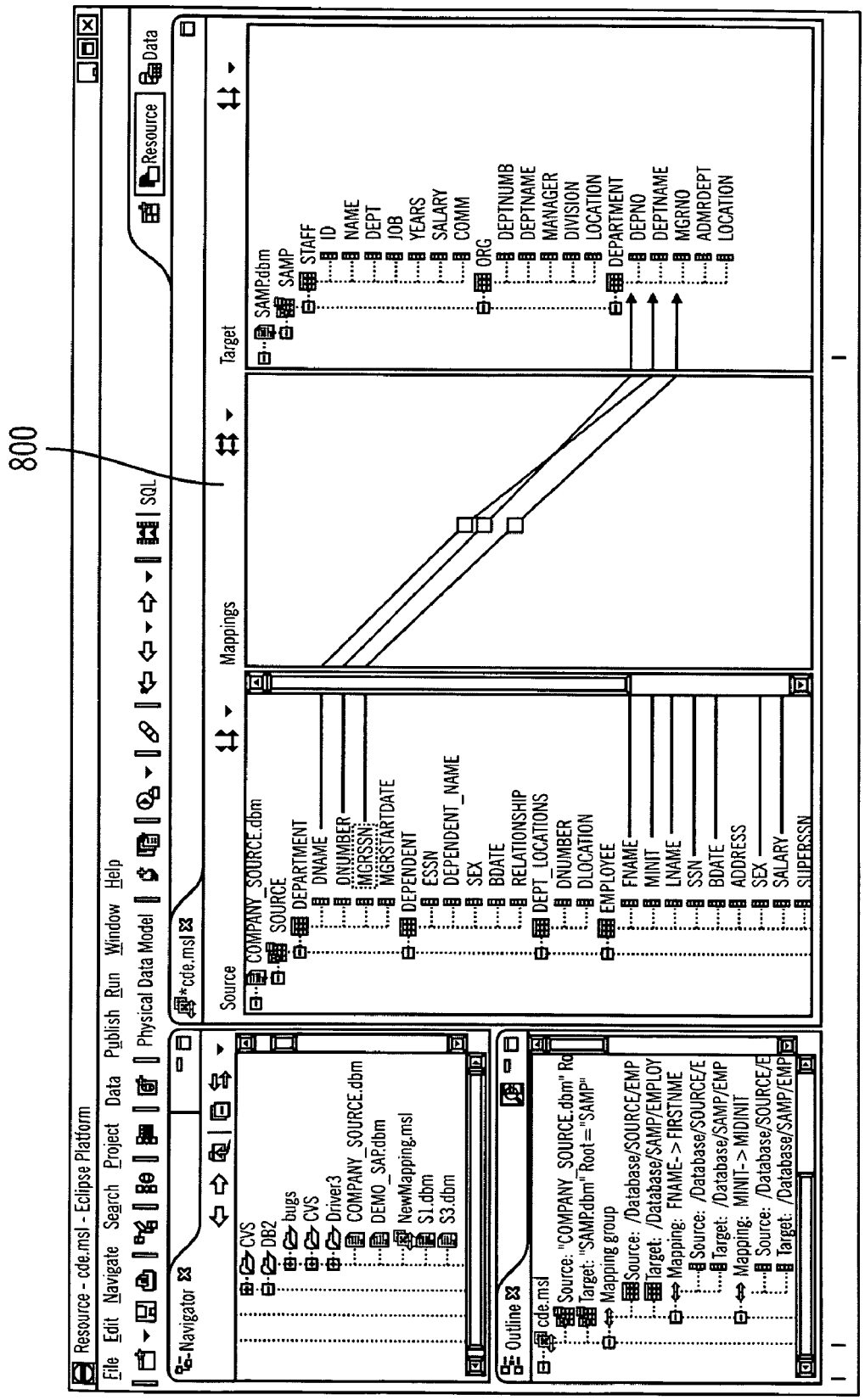
FIG. 8 illustrates a main view in which results of selecting a hide mapped view filter are displayed in accordance with certain embodiments.

In one example scenario, a user wants to see what is left to map in the target schema. The user opens the view filter pulldown menu 750 in the target area 750 and selects a "Hide Mapped" view filter. FIG. 8 illustrates a main view 800 in which results of selecting a hide mapped view filter are displayed in accordance with certain embodiments. In particular, in the main view 800, unmapped tables are shown in the target schema. Note that because the columns of the department table are partially mapped (i.e., not fully mapped), the department table is treated as an "unmapped" table for filtering by the user interface system 120 and is displayed in the main view 800.

Figure 9:
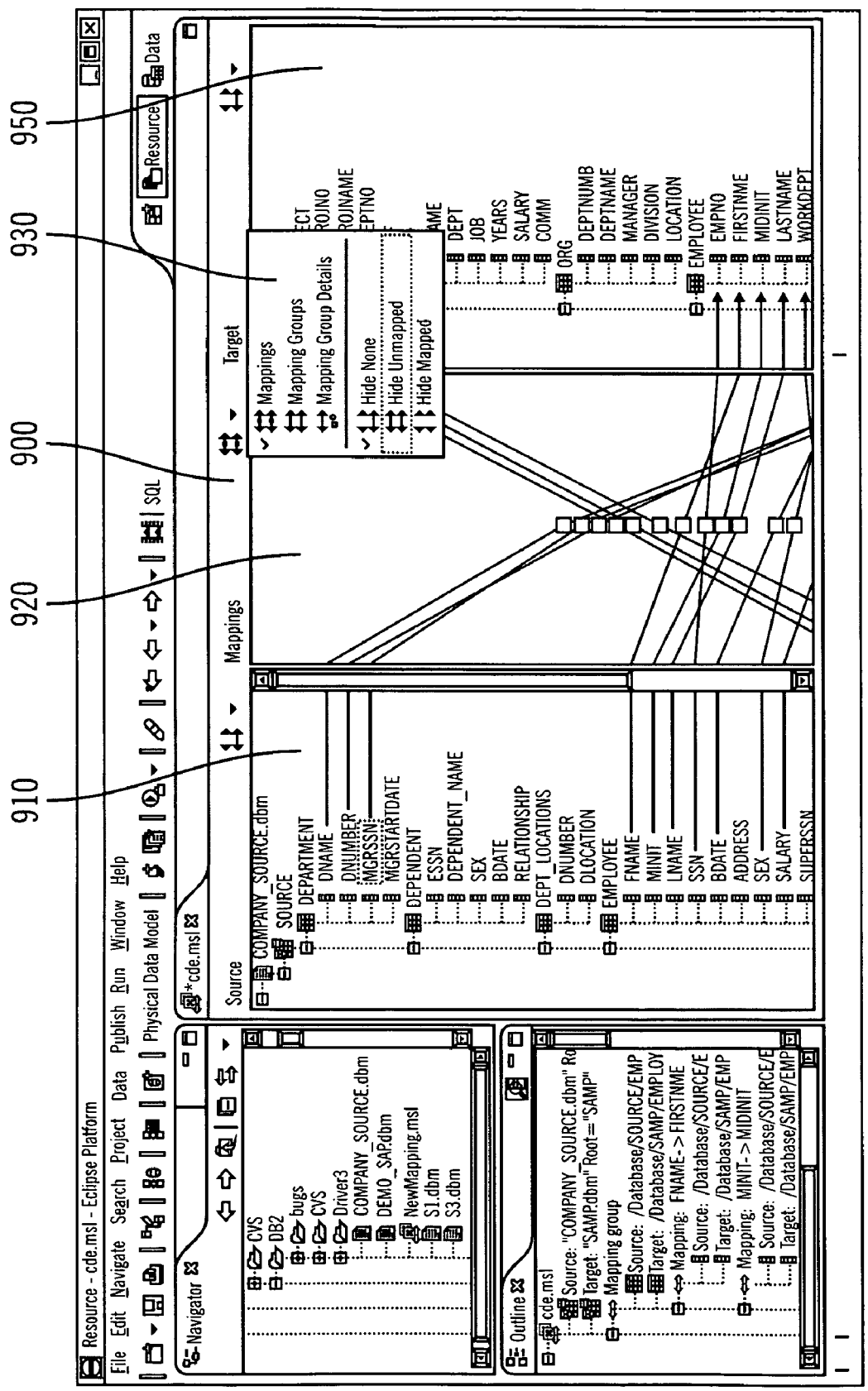
FIG. 9 illustrates a main view in which a hide unmapped view filter has been selected in accordance with certain embodiments in accordance with certain embodiments.

FIG. 9 illustrates a main view 900 in which a hide unmapped view filter has been selected in accordance with certain embodiments. The main view 900 includes three areas: a source area 910, a middle area 920, and a target area 930. Although the main view 700 illustrates a detail view, in alternative embodiments, the main view 900 may illustrate an overview or a single mapping group view. The view filters are available in each of the three views 910, 920, 930 of the main view 900. In another example scenario, a user wants to focus on the objects that will participate in the mapping from source to target schema and ignore the unmapped objects. The user opens a view filter pulldown menu 950 in the middle area 920 and selects the "Hide Unmapped" view filter.

Figure 10:
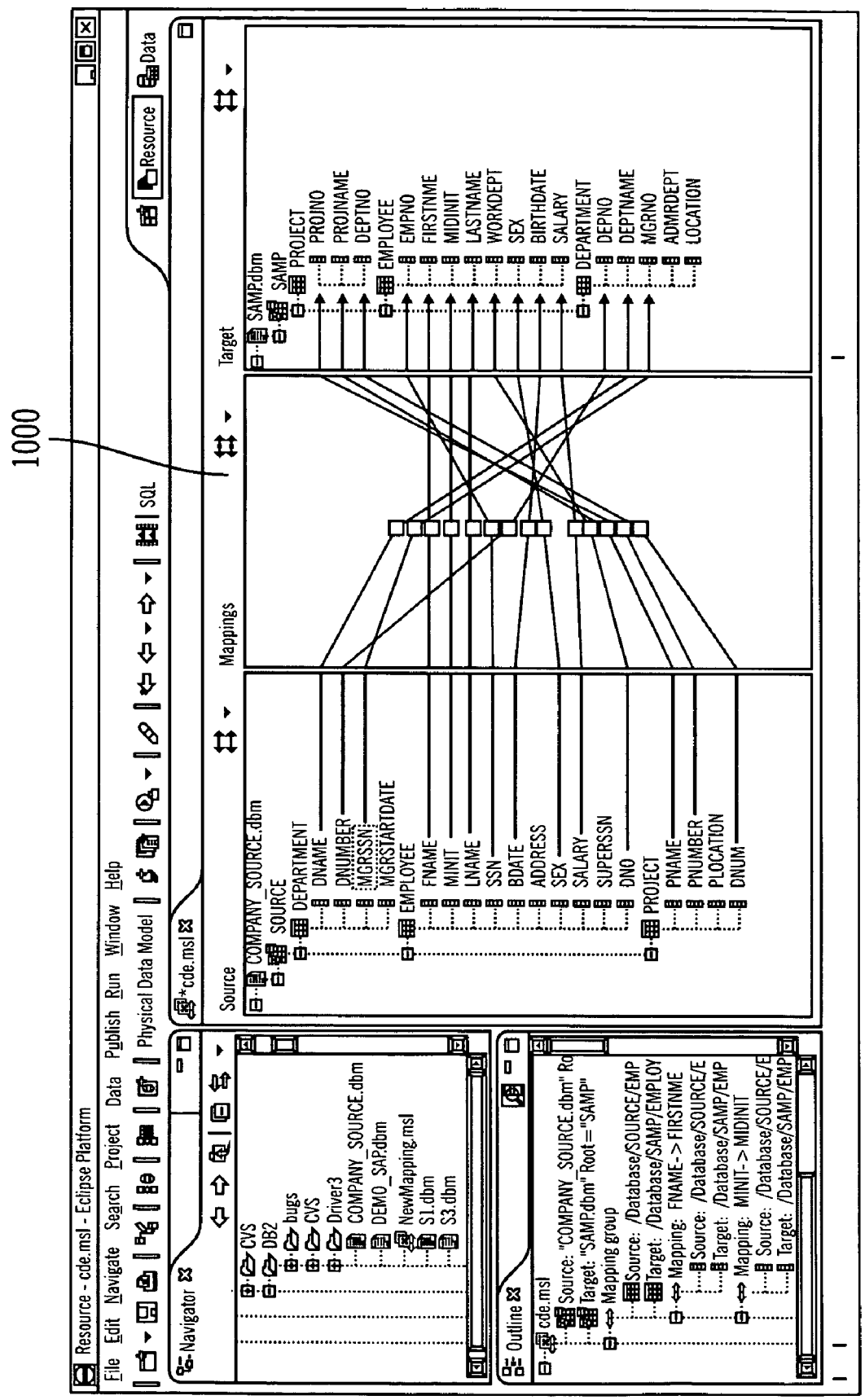
FIG. 10 illustrates a main view in which results of selecting a hide unmapped view filter are displayed in accordance with certain embodiments.

FIG. 10 illustrates a main view 1000 in which results of selecting a hide unmapped view filter are displayed in accordance with certain embodiments. In particular, in the main view 1000, unmapped tables are hidden and mapped tables are shown in the source and target areas.

Figure 11:
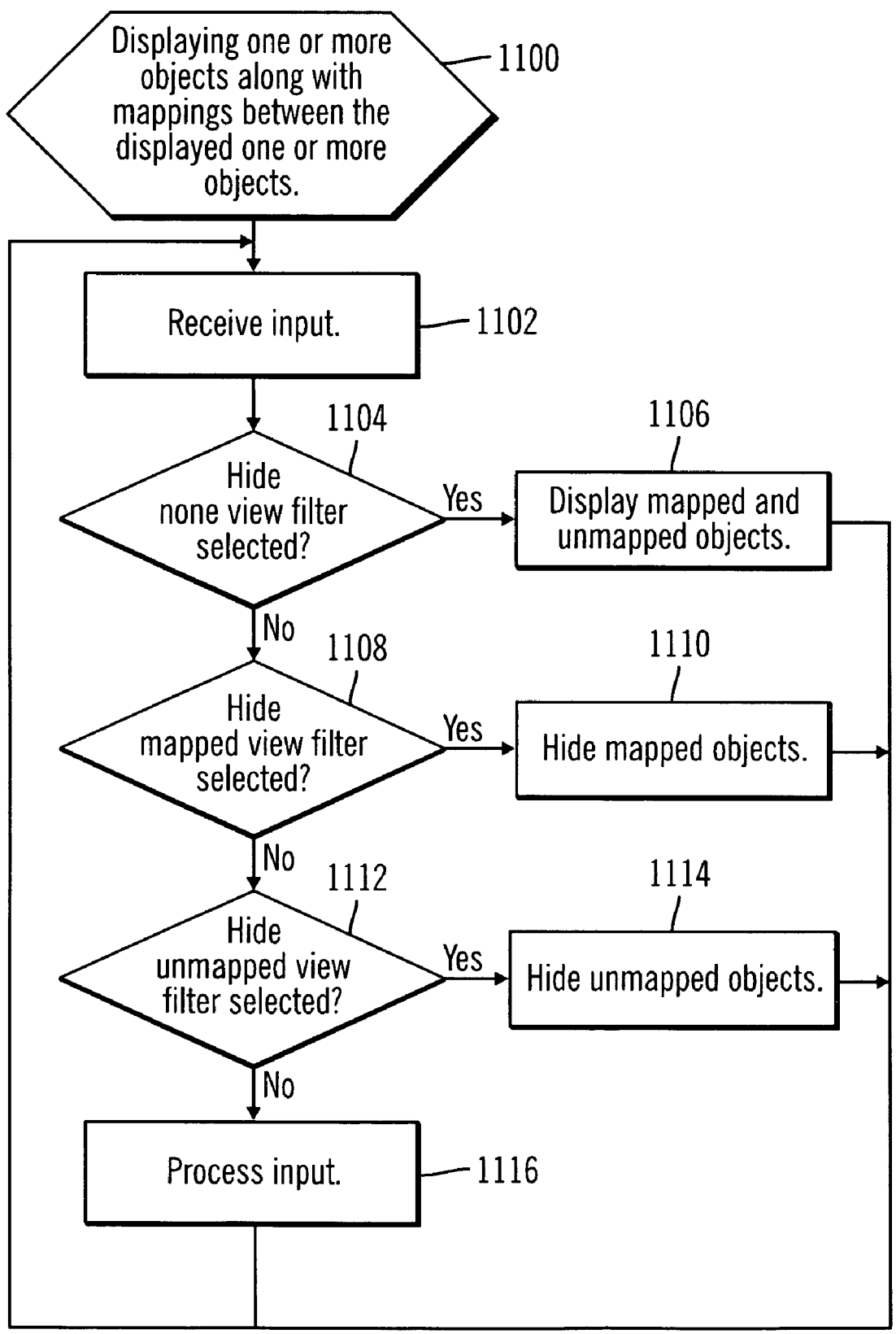
FIG. 11 illustrates logic performed by a user interface system for processing view filters in accordance with certain embodiments.

FIG. 11 illustrates logic performed by the user interface system 120 for processing view filters in accordance with certain embodiments. Control begins at block 1100 with the user interface system 120 displaying one or more objects along with mappings between the displayed one or more objects. In certain embodiments the one or more objects are displayed within a source area and a target area of a main view, while the mappings are displayed using a middle area of the main view. In block 1102, the user interface system 120 receives input. In block 1104, the user interface system 120 determines whether the input indicates that the hide none view filter has been selected. If so, processing continues to block 1106, otherwise, processing continues to block 1108. In block 1106, the user interface system 120 displays mapped and unmapped objects and processing loops back to block 1102.

In block 1108, the user interface system 120 determines whether the input indicates that the hide mapped view filter has been selected. If so, processing continues to block 1110, otherwise, processing continues to block 1112. In block 1110, the user interface system 120 hides mapped objects. From block 1110, processing loops back to block 1102.

In block 1112, the user interface system 120 determines whether the input indicates that the hide unmapped view filter has been selected. If so, processing continues to block 1114, otherwise, processing continues to block 1116. In block 1114, the user interface system 120 hides unmapped objects. From block 1114, processing loops back to block 1102.

In block 1118, the user interface system 120 processes the input and processing loops back to block 1102.

Embodiments provide a hide option, a show only option, a restore option, and a restore all option. In particular, embodiments provide a hide option that allows a user to select one or more nodes in a structure (e.g., a hierarchical structure) and request that these nodes and the descendants of the selected nodes be hidden. Also, embodiments provide a show only option that enables quickly scoping or manipulating a structure (e.g., a hierarchical structure or tree type structure) of nodes to show selected nodes and ancestors of the selected nodes. In particular, the show only option allows the user to select one or more nodes of interest and to select the show only option to display the selected nodes of interest and the ancestors and descendants of the selected nodes.

Also, a user may successively apply hide or show only options to one or more nodes, and then use a restore option to restore the nodes hidden a step at a time based on each previous hide or show only option or use a restore all option to restore all hidden nodes at once. The restore option restores the hidden nodes in the reverse order in which they were hidden by selection of the hide or show only options. Thus, with embodiments, a user is able to hide nodes that are not of interest, enabling the user to focus only on nodes of interest.

In various embodiments, the hide option, a show only option, a restore option, and a restore all option may be provided via various techniques, such as a popup menu, a pulldown menu or buttons.

The hidden nodes remain in the structure models 124, but are not displayed on the output device 150.

FIGS. 12-18 provide illustrations to show how the hide, show only, restore, and restore all options operate in accordance with certain embodiments. In the examples of FIGS. 12-18, tables and columns are illustrated in hierarchical structures in source and target areas.

Figure 12:
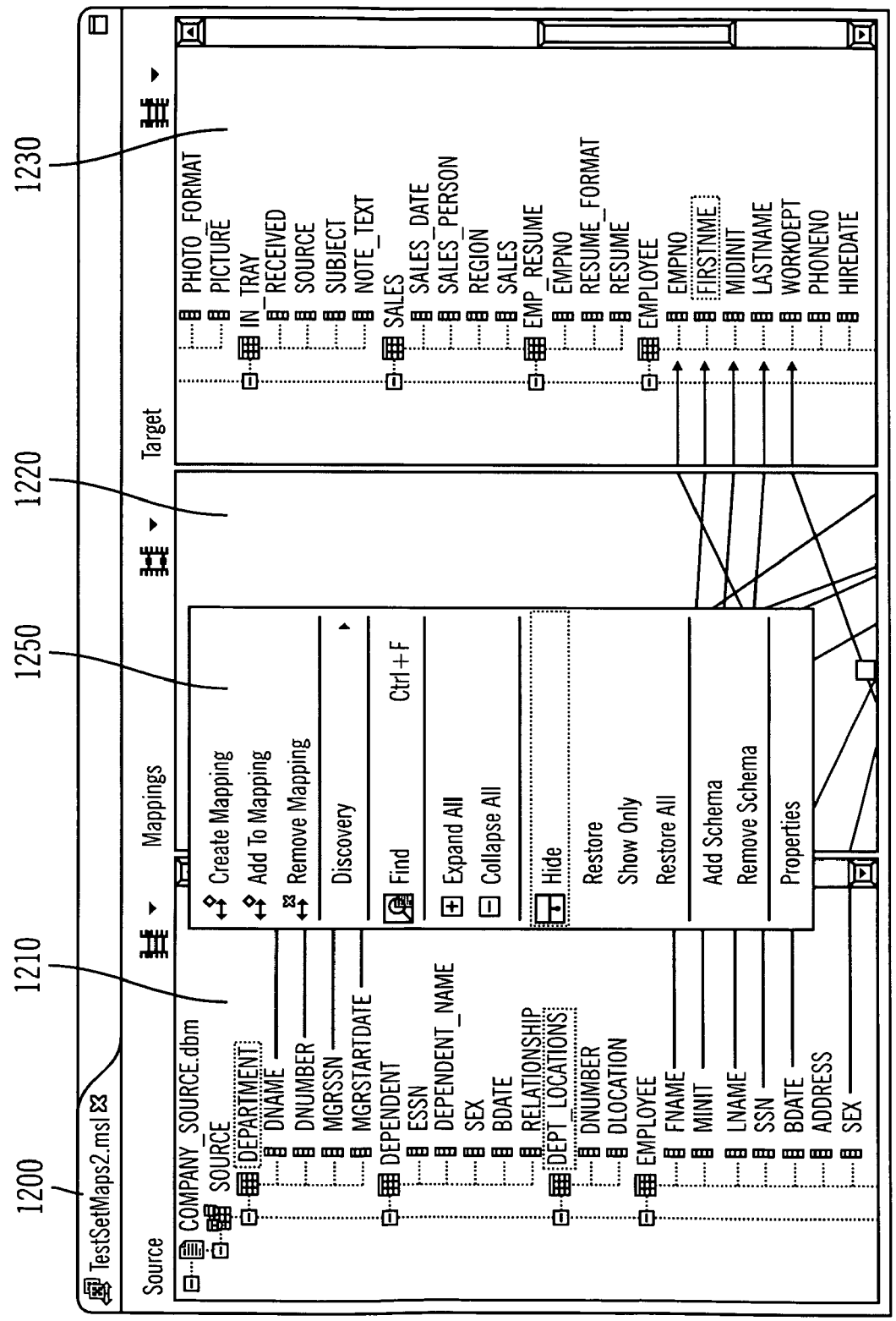
FIG. 12 illustrates a main view and a popup menu with various options in accordance with certain embodiments.

FIG. 12 illustrates a main view 1200 and a popup menu 1250 with various options in accordance with certain embodiments. The main view 1200 includes three areas: a source area 1210, a middle area 1220, and a target area 1230. Although the main view 1200 illustrates a detail view, in alternative embodiments, the main view 1200 may illustrate an overview or a single mapping group view. The popup menu 1250 includes a hide option, a show only option, a restore option, and a restore all option. These options are available for any node in the source area 1210 and the target area 1230 of the main view 1200.

To hide nodes, a user selects one or more nodes and selects the hide option. For example, in FIG. 12, a user-has selected the Department and Dept_Locations tables in the source area 1210. Then, the user selects the hide option from the popup menu 1250.

Figure 13:
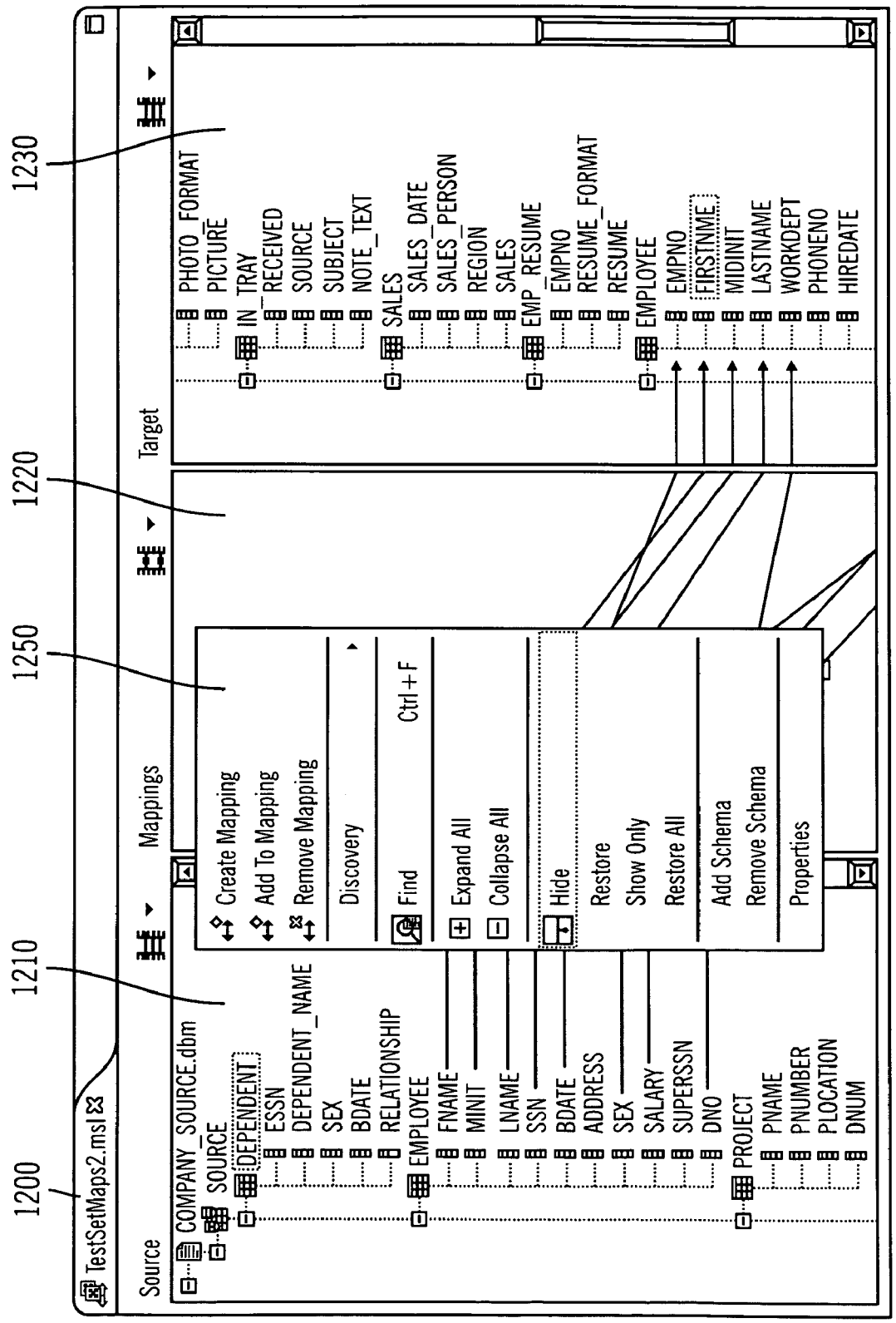
FIG. 13 illustrates a main menu after a first hide option has been selected in accordance with certain embodiments.

FIG. 13 illustrates a main menu 1200 after a first hide option has been selected in accordance with certain embodiments. In this case, the Department and Dept_Locations tables are no longer displayed in the source area 1210 (i.e., these tables are hidden). Also, the Dependent table has been selected from the source area 1210, and the hide option has been selected from the popup-menu 1250.

Figure 14:
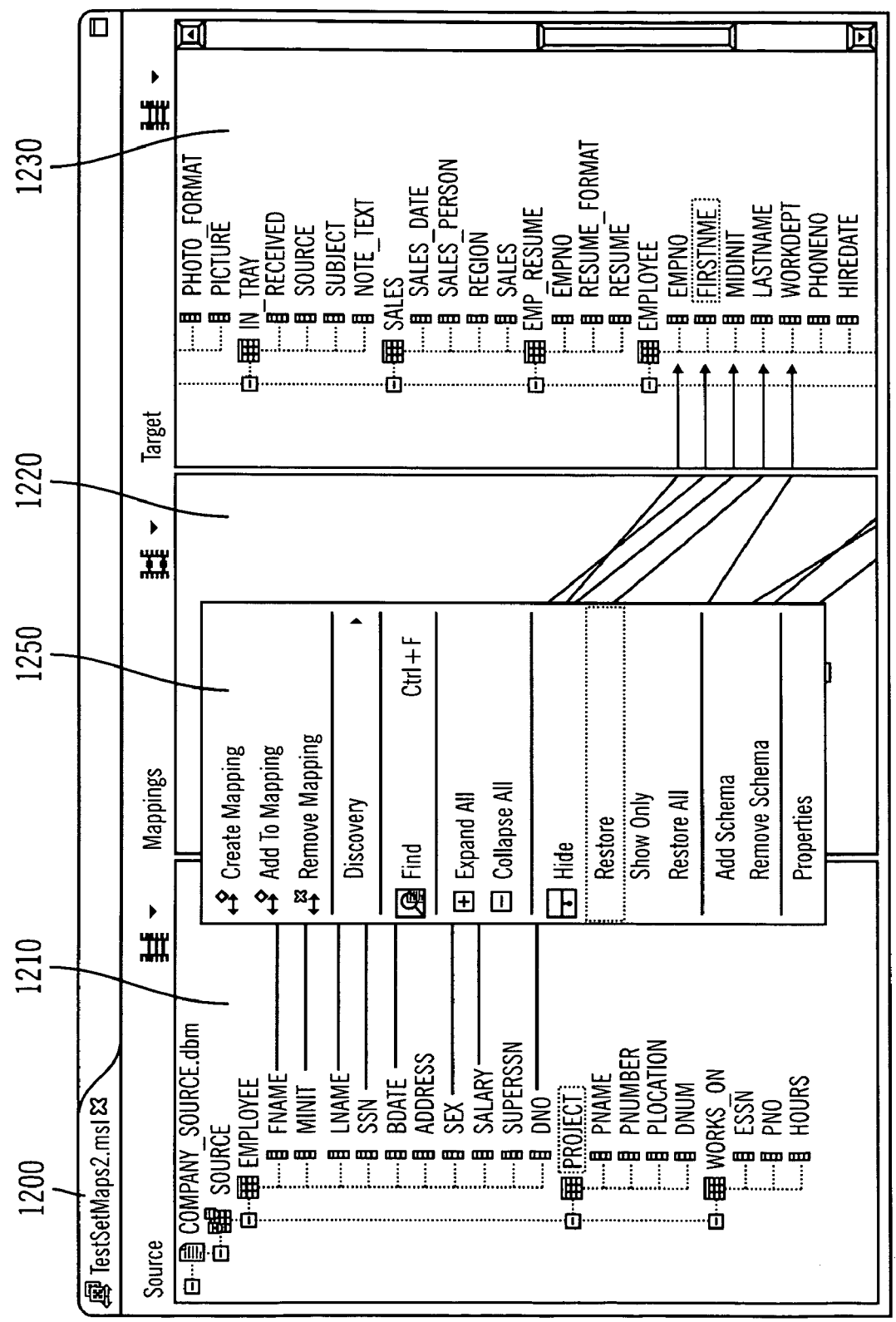
FIG. 14 illustrates a main menu after a second hide option has been selected in accordance with certain embodiments.

FIG. 14 illustrates a main menu 1200 after a second hide option has been selected in accordance with certain embodiments. In FIG. 14, the Dependent table is no longer displayed in the source area 1210. Also, the Department and Dept_Locations tables remain hidden. The user selects the restore option from the popup menu 1250.

Figure 15:
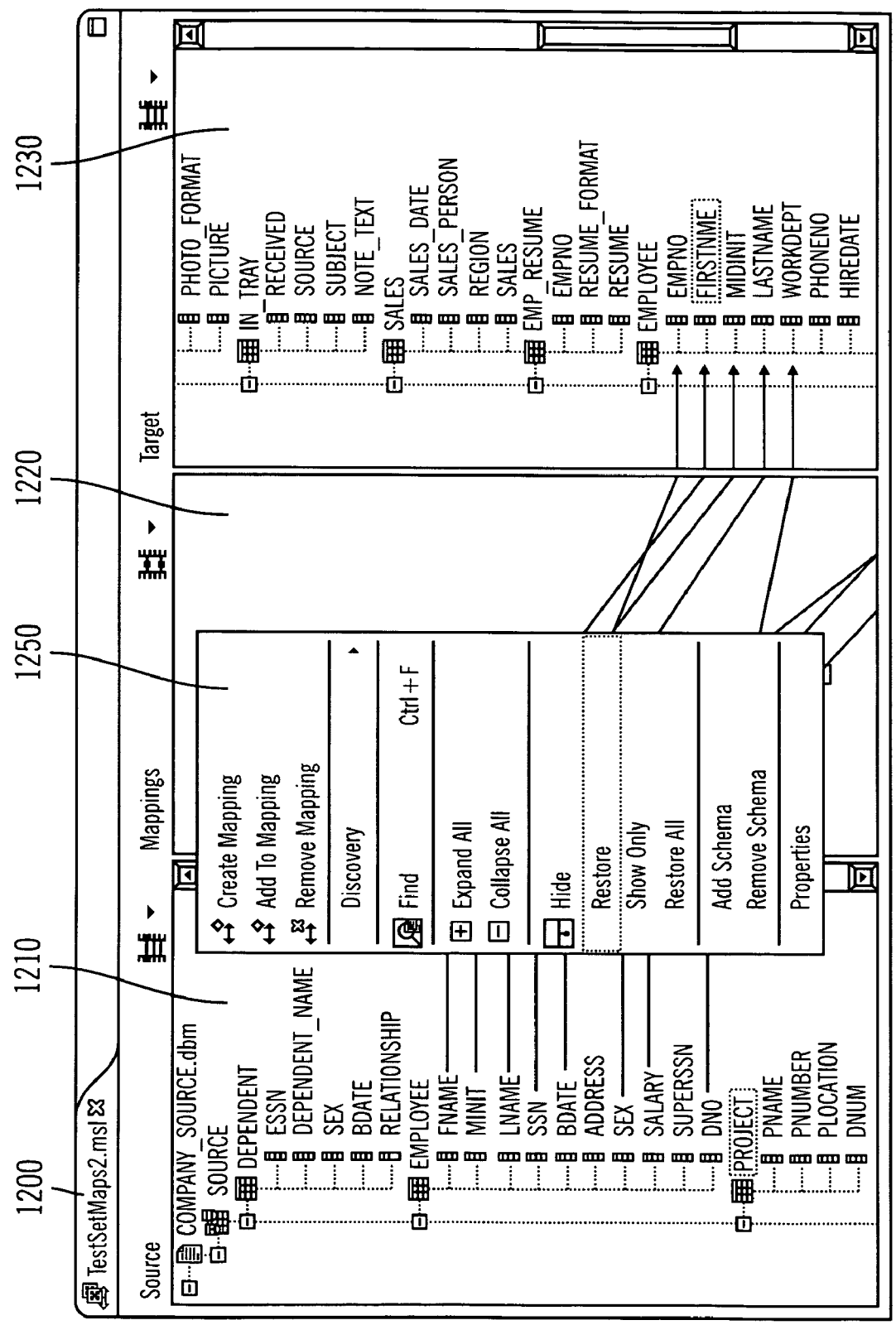
FIG. 15 illustrates a main menu after a first restore option has been selected in accordance with certain embodiments.

FIG. 15 illustrates a main menu 1200 after a first restore option has been selected in accordance with certain embodiments. In FIG. 14, the Dependent table is now displayed again in the source area 1210. The Department and Dept_Locations tables remain hidden. Also, the restore option is again selected from the popup menu 1250.

Figure 16:
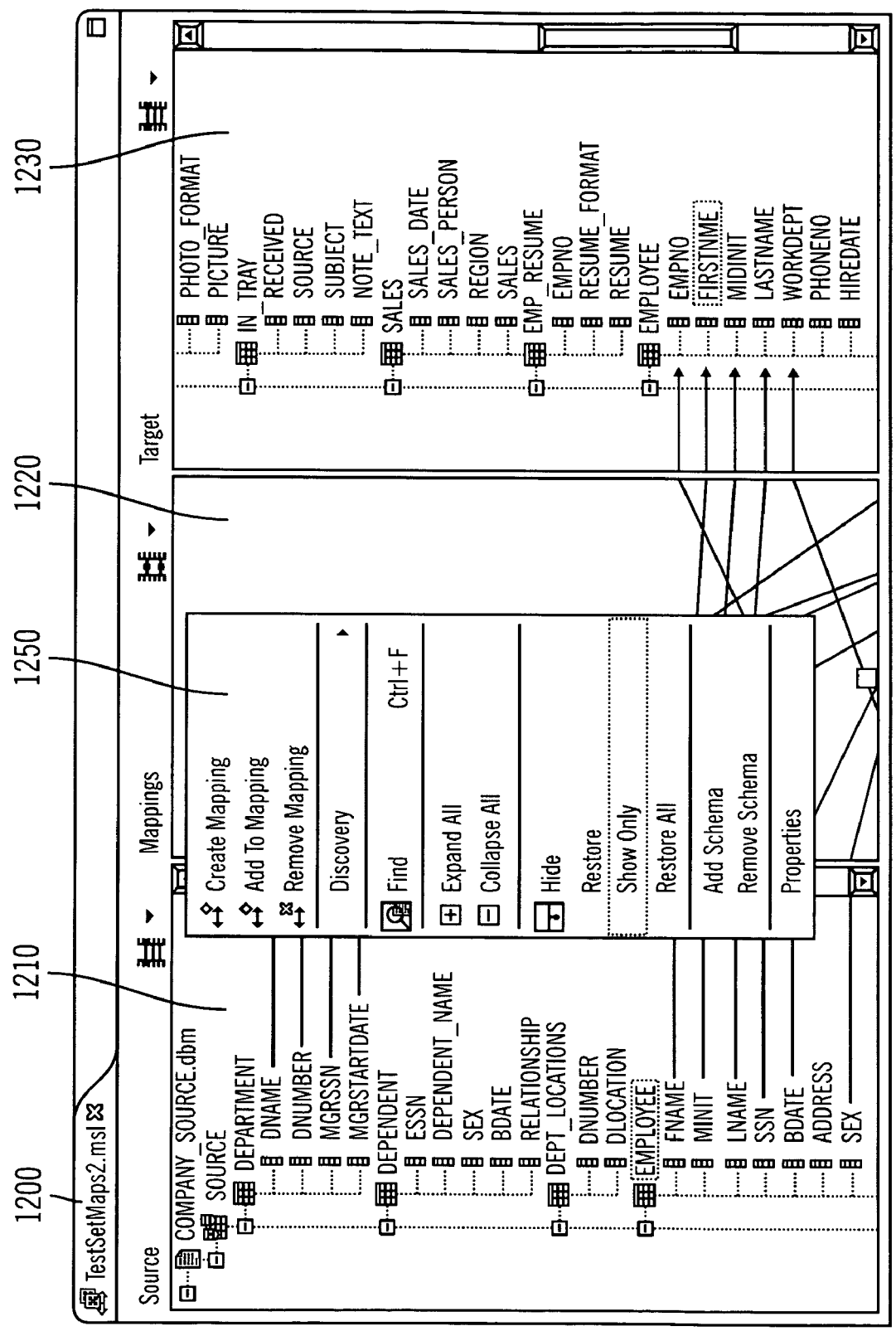
FIG. 16 illustrates a main menu after a second restore option has been selected in accordance with certain embodiments.

FIG. 16 illustrates a main menu 1200 after a second restore option has been selected in accordance with certain embodiments. In FIG. 16, the Department and Dept_Locations tables are displayed again in the source area 1210. Also, the user now selects the Employee table from the source area 1210 and selects the show only option from the popup menu 1250.

Figure 17:
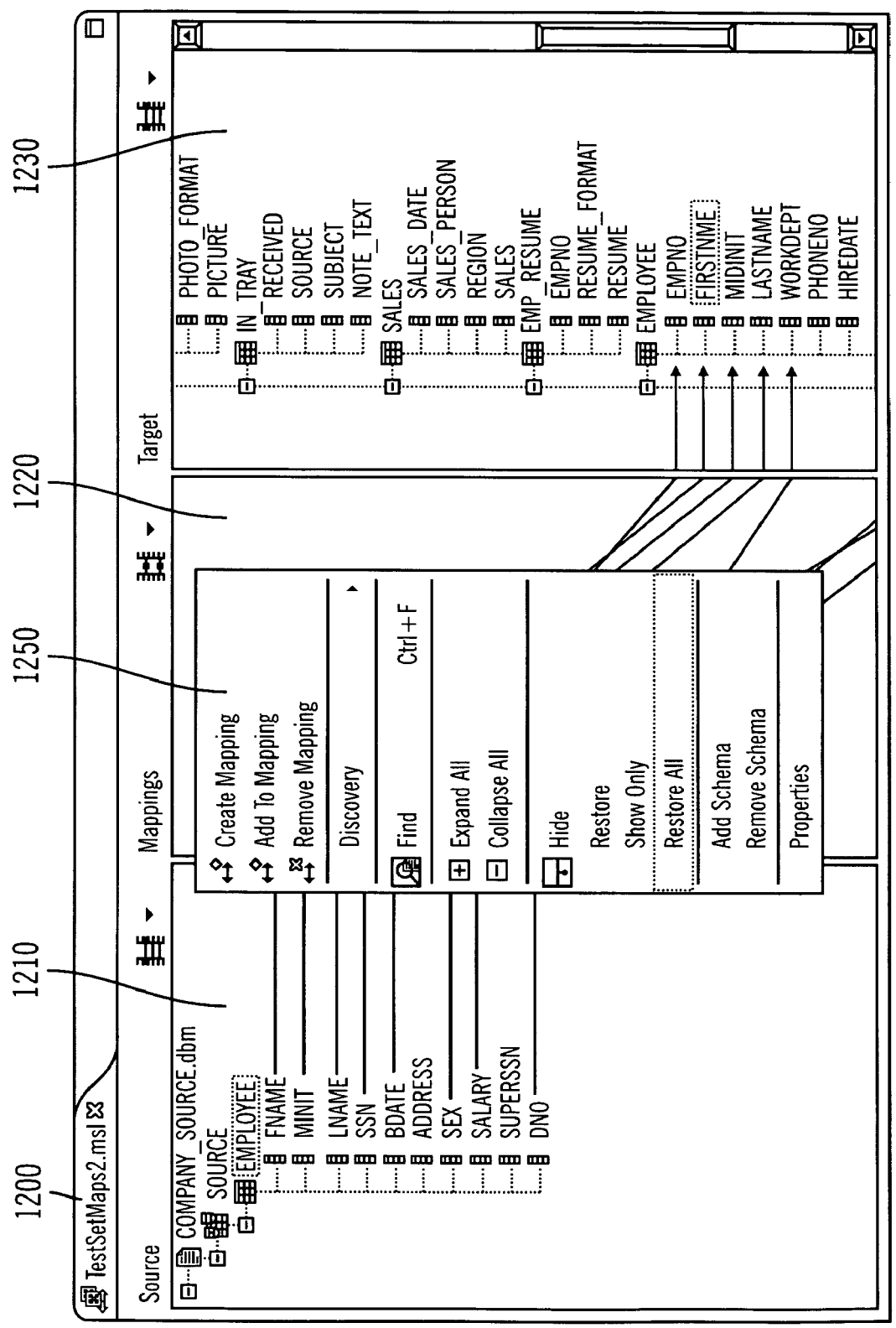
FIG. 17 illustrates a main menu after a show only option has been selected in accordance with certain embodiments.

FIG. 17 illustrates a main menu 1200 after a show only option has been selected in accordance with certain embodiments. In FIG. 17, the only table displayed in the source area 1210 is the Employee table, and all other tables are hidden. In particular, as a result of the show only option, only the selected nodes, ancestors of the selected nodes, and descendants of the selected nodes remain displayed in the main view 1200. Also, in FIG. 17, the restore all option has been selected from the popup menu 1250.

In particular, to bring back the other nodes, the user selects a restore all option from the popup menu 1450. In alternative embodiments, a graphical placeholder is displayed where nodes have been hidden, and the user is allowed to select that placeholder to bring back hidden nodes. In other alternative embodiments, the user may select a node before selecting the restore all and the hidden descendant children of that node are shown.

Figure 18:
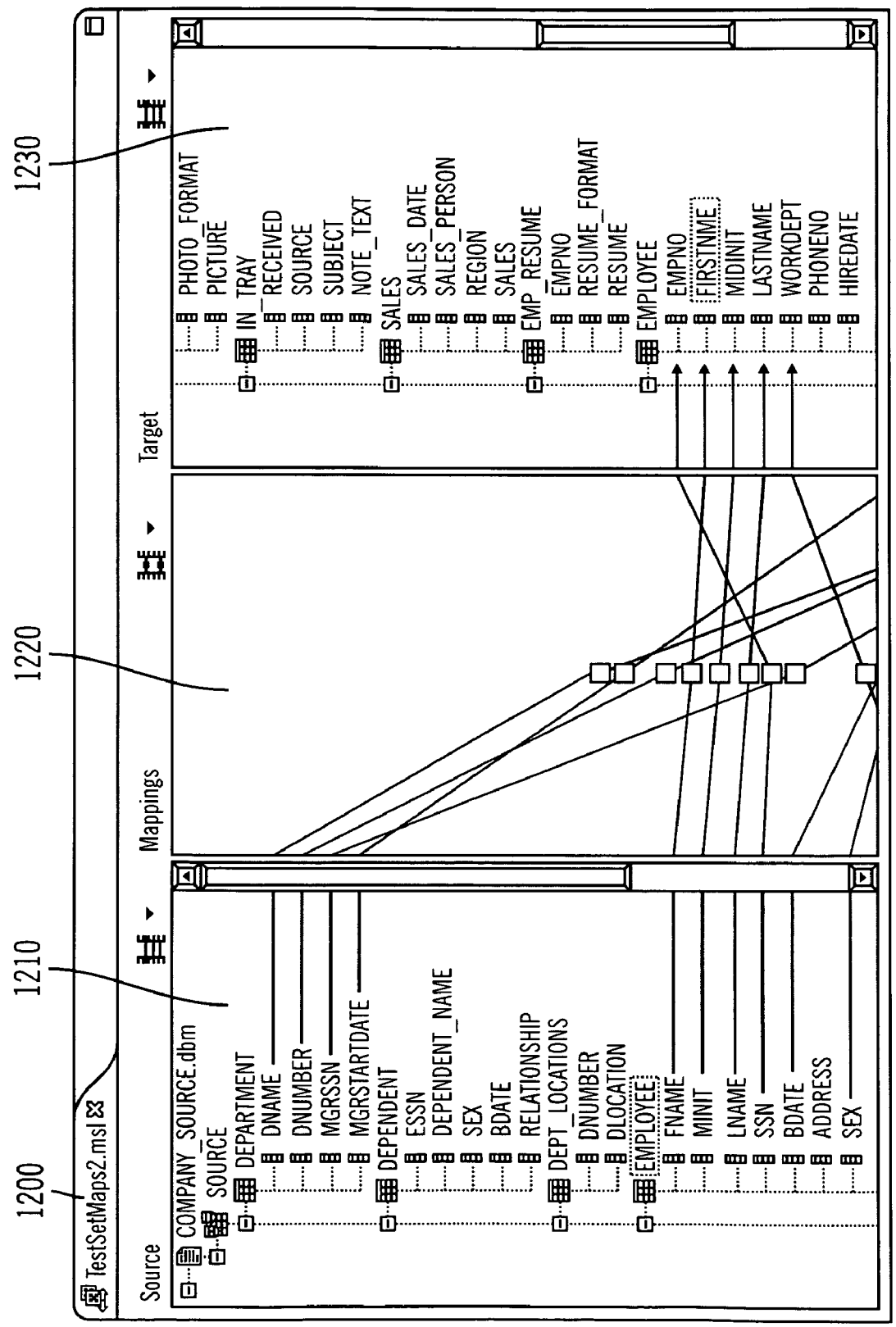
FIG. 18 illustrates a main menu after a restore all option has been selected in accordance with certain embodiments.

FIG. 18 illustrates a main menu 1200 after a restore all option has been selected in accordance with certain embodiments. In FIG. 18, the main menu 1200 displays all nodes that had been hidden by the show only option selected in FIGS. 16 and 17.

The hide, show only, restore, and restore all options work for any type of structure. These options are especially useful for tasks that are graphically complex (e.g., mappings between source and target schemas), as these types of workspaces may get very cluttered.

Figure 19:
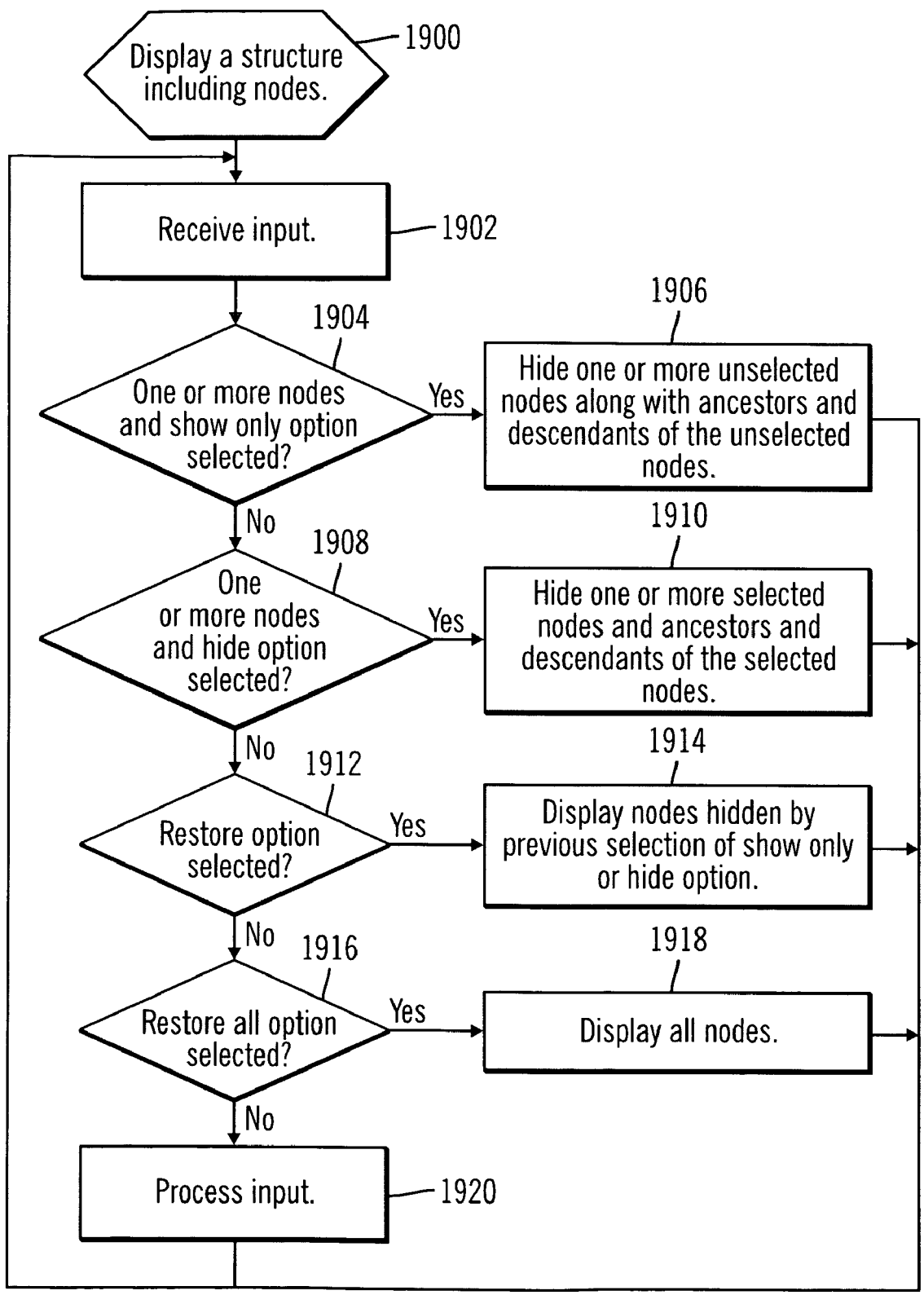
FIG. 19 illustrates logic performed by a user interface system for viewing nodes of a structure in accordance with certain embodiments.

FIG. 19 illustrates logic performed by the user interface system 120 for viewing nodes of a structure in accordance with certain embodiments. Control begins at block 1900 with the user interface system 120 displaying a structure including nodes (e.g., a hierarchical structure). In certain embodiments, the structure is displayed within a source area or a target area of a main view that includes the source area, a middle area, and the target area. In block 1902, the user interface system 120 receives input. In block 1904, the user interface system 120 determines whether the input indicates that one or more nodes and the show only option have been selected. If so, processing continues to block 1906, otherwise, processing continues to block 1908. In block 1906, the user interface system 120 hides one or more unselected nodes along with ancestors and descendants of the unselected nodes and processing loops back to block 1902.

In block 1908, the user interface system 120 determines whether the input indicates that one or more nodes and the hide option have been selected. If so, processing continues to block 1910, otherwise, processing continues to block 1912. In block 1910, the user interface system 120 hides the one or more selected nodes and ancestors and descendants of the selected nodes and processing loops back to block 1902.

In block 1912, the user interface system 120 determines whether the input indicates that the restore option has been selected. If so, processing continues to block 1914, otherwise, processing continues to block 1916. In block 1914, the user interface system 120 displays nodes that had previously been hidden by the previous selection of a show only or hide option (i.e., restores any nodes hidden in response to selection of a previous show only or hide option) and processing loops back to block 1902.

In block 1916, the user interface system 120 determines whether the input indicates that the restore all option has been selected. If so, processing continues to block 1918, otherwise, processing continues to block 1929. In block 1918, the user interface system 120 displays all nodes (i.e., restores any nodes hidden in response to selection of a show only or hide option) and processing loops back to block 1902.

In block 1920, the user interface system 120 processes the input and processing loops back to block 1902.

Thus embodiments provide multiple views (i.e., a overview, a detail view, and a single mapping group view) to enable users to view mapping data between objects. Embodiments also provide view filters to enable hiding mapped or unmapped objects. Moreover, embodiments, provide hide, show only, restore, and restore all options to enable easier navigation of structures.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term logic may include, by way of example, software or hardware and/or combinations of software and hardware.

The logic of FIGS. 6, 11, and 19 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 6, 11, and 19 may be implemented in software, hardware, programmable and non-programmable gate array logic or in some combination of hardware, software, or gate array logic.

Figure 20:
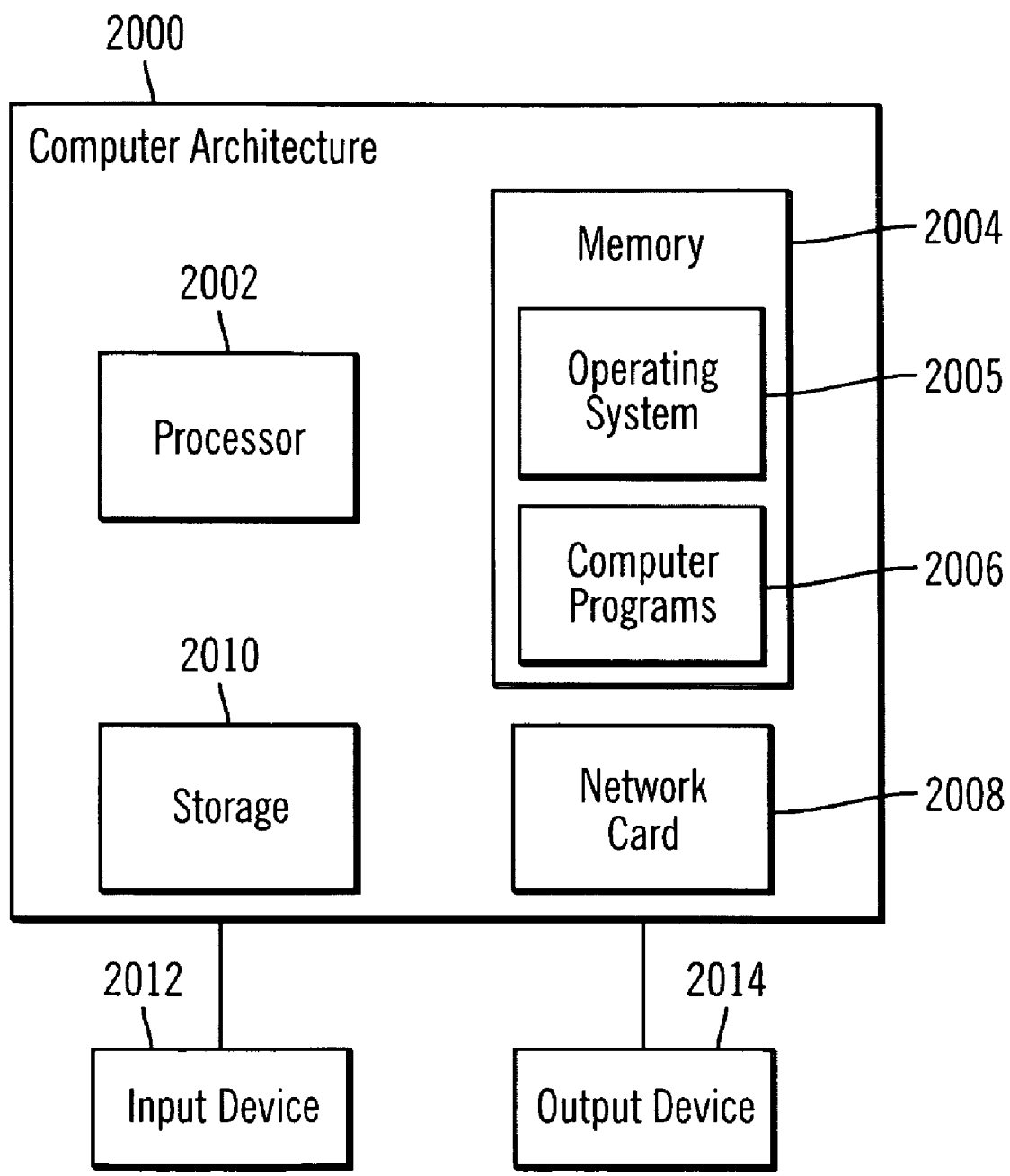
FIG. 20 illustrates an architecture of a computer system that may be used in accordance with certain embodiments.

FIG. 20 illustrates an architecture 2000 of a computer system that may be used in accordance with certain embodiments. Computing device 100 may implement architecture 2000. The computer architecture 2000 may implement a processor 2002 (e.g., a microprocessor), a memory 2004 (e.g., a volatile memory device), and storage 2010 (e.g., a non-volatile storage area, such as magnetic disk drives, optical disk drives, a tape drive, etc.). An operating system 2005 may execute in memory 2004. The storage 2010 may comprise an internal storage device or an attached or network accessible storage. Computer programs 2006 in storage 2010 may be loaded into the memory 2004 and executed by the processor 2002 in a manner known in the art. The architecture further includes a network card 2008 to enable communication with a network. An input device 2012 is used to provide user input to the processor 2002, and may include a keyboard, mouse, pen-stylus, microphone, touch sensitive display screen, or any other activation or input mechanism known in the art. An output device 2014 is capable of rendering information from the processor 2002, or other component, such as a display monitor, printer, storage, etc. The computer architecture 2000 of the computer systems may include fewer components than illustrated, additional components not illustrated herein, or some combination of the components illustrated and additional components.

The computer architecture 2000 may comprise any computing device known in the art, such as a mainframe, server, personal computer, workstation, laptop, handheld computer, telephony device, network appliance, virtualization device, storage controller, etc. Any processor 2002 and operating system 2005 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the invention, the embodiments reside in the claims hereinafter appended or any subsequently-filed claims, and their equivalents.

What is claimed is:

1. A method for viewing mappings between objects, comprising:
    displaying, using a computer including a processor, on a single screen a navigator view that lists files available at the computer, an outline view that provides textual information about mappings, a properties view that provides information about a currently selected table, and a main view that shows one of an overview that shows mappings between source tables and target tables, a detail view that shows column mappings, and a single mapping group view that shows column mappings, wherein each type of view provides a different amount of detail regarding the mappings, wherein the main view includes a source area, a middle area, and a target area;
    receiving input selecting the type of view to be displayed in the main view; and
    in response to receiving the input,
        creating the selected type of view; and
        displaying the created view by:
            in response to receiving the selection of the overview using a pull-down menu, displaying the source tables without displaying source columns, displaying the target tables without displaying the target columns, and displaying the mappings between the source tables and the target tables;
            in response to receiving the selection of the detail view using the pull-down menu, displaying the source tables and the source columns, displaying the target tables and the target columns, and displaying column mappings between the source columns and the target columns; and
            in response to receiving selection of the single mapping group view using the pull-down menu, displaying one source table and the source columns of the one source table, displaying one target table and the target columns of the one target table, and displaying column mappings between the source columns of the one source table and the target columns of the one target table.

2. The method of claim 1, further comprising:
    storing a mapping model that includes information on one or more source objects, one or more target objects, and one or more mappings between the one or more source objects and the one or more target objects, that includes references to information in one or more structure models, and that associates the one or more mappings with one or more mapping groups, wherein the one or more mapping groups are formed based on grouping criteria, wherein the one or more source objects comprise the source tables, and wherein the one or more target objects comprise the target tables.

3. The method of claim 2, wherein the one or more source objects comprise source tables that include source columns, and wherein the one or more target objects comprise target tables that include target columns.

4. The method of claim 2, wherein the one or more source objects comprise source tables, wherein the one or more target objects comprise target tables, wherein the received input comprises selection of a single mapping group view, and further comprising:
    receiving selection of the single mapping group view by receiving selection of a hub representing a single mapping group, wherein the hub is displayed on a mapping line in the middle area.

5. The method of claim 2, further comprising:
    receiving input selecting a hide none view filter; and
    in response to receiving the input, displaying mapped and unmapped source objects and target objects.

6. The method of claim 2, further comprising:
    receiving input from a user selecting a hide mapped view filter, wherein the user does not select source objects and target objects; and
    in response to receiving the input, hiding mapped source objects and target objects.

7. The method of claim 2, further comprising:
    receiving input from a user selecting a hide unmapped view filter, wherein the user does not select source objects and target objects; and
    in response to receiving the input, hiding unmapped source objects and target objects.

8. The method of claim 1, wherein at least one of the source area and the target area includes a hierarchical structure of nodes and further comprising:
    receiving selection of one or more nodes;
    receiving input selecting a show only option; and
    in response to receiving the input, hiding one or more unselected nodes along with ancestors and descendants of the unselected nodes.

9. The method of claim 1, wherein the at least one of the source area and the target area includes a hierarchical structure of nodes and further comprising:
    receiving selection of one or more nodes;
    receiving input selecting a hide option; and
    in response to receiving the input, hiding the one or more selected nodes and ancestors and descendants of the selected one or more nodes.

10. The method of claim 1, wherein at least one of the source area and the target area includes a hierarchical structure of nodes and further comprising:
    receiving input selecting a restore option, wherein the restore option restores nodes hidden a step at a time based on previous selections of a hide option or a show only option; and
    in response to receiving the input, displaying nodes hidden by a single previous selection of a show only or hide option.

11. The method of claim 1, wherein at least one of the source area and the target area includes a hierarchical structure of nodes and further comprising:
    receiving input selecting a restore all option; and
    in response to receiving the input, displaying nodes hidden by each previous selection of a show only or hide option.

12. The method of claim 2, wherein the one or more source objects are displayed in the source area and the one or more target objects are displayed in the target area.

13. A method for viewing objects, further comprising:
displaying, with a computer including a processor, source tables and target tables along with mappings between some of the source tables and the target tables;
providing view filters of hide unmapped and hide mapped that are to be applied to the displayed source tables and the displayed target tables;
receiving input from a user selecting a view filter from one of the source area, the middle area, and the target area without selecting any of the source tables and the target tables, wherein the view filter is applied to the source tables when the view filter is selected in the source area, wherein the view filter is applied to the source tables and to the target tables when selected in the middle area, and wherein the view filter is applied to the target tables when selected form the target area;
in response to receiving input from the user selecting a hide mapped view filter, hiding the source tables and the target tables that have already been mapped to other tables based on whether the hide mapped view filter was selected in the source area, the middle area or the target area; and
in response to receiving input from a user selecting a hide unmapped view filter, hiding the source tables and the target tables that have not already been mapped to other tables based on whether the hide unmapped view filter was selected in the source area, the middle area or the target area.

14. The method of claim 13, further comprising:
receiving input selecting a hide none view filter; and
in response to receiving the input, displaying mapped and unmapped source objects and target objects.

15. An article of manufacture for viewing mappings between objects, wherein the article of manufacture comprises a computer readable storage medium storing program instructions, and wherein the program instructions, when executed on a processor of a computer, are operable to:
display on a single screen a navigator view that lists files available at the computer, an outline view that provides textual information about mappings, a properties view that provides information about a currently selected table, and a main view that shows one of an overview that shows mappings between source tables and target tables, a detail view that shows column mappings, and a single mapping group view that shows column mappings, wherein each type of view provides a different amount of detail regarding the mappings, wherein the main view includes a source area, a middle area, and a target area;
receive input selecting the type of view to be displayed in the main view; and
in response to receiving the input,
create the selected type of view; and
display the created view by:
in response to receiving the selection of the overview using a pull-down menu, displaying the source tables without displaying source columns, displaying the target tables without displaying the target columns, and displaying the mappings between the source tables and the target table;
in response to receiving the selection of the detail view using the pull-down menu, displaying the source tables and the source columns, displaying the target tables and the target columns, and displaying column mappings between the source columns and the target columns; and
in response to receiving selection of the single mapping group view using the pull-down menu, displaying one source table and the source columns of the one source table, displaying one target table and the target columns of the one target table, and displaying column mappings between the source columns of the one source table and the target columns of the one target table.

16. The article of manufacture of claim 15, wherein the article of manufacture is further operable to:
store a mapping model that includes information on one or more source objects, one or more target objects, and one or more mappings between the one or more source objects and the one or more target objects, that includes references to information in one or more structure models, and that associates the one or more mappings with one or more mapping groups, wherein the one or more mapping groups are formed based on grouping criteria, wherein the one or more source objects comprise the source tables, and wherein the one or more target objects comprise the target tables.

17. The article of manufacture of claim 16, wherein the one or more source objects comprise source tables that include source columns, and wherein the one or more target objects comprise target tables that include target columns.

18. The article of manufacture of claim 16, wherein the one or more source objects comprise source tables, wherein the one or more target objects comprise target tables, wherein the received input comprises selection of a single mapping group view, and wherein the article of manufacture is further operable to:
receiving selection of the single mapping group view by receiving selection of a hub representing a single mapping group, wherein the hub is displayed on a mapping line in the middle area.

19. The article of manufacture of claim 16, wherein the article of manufacture is further operable to:
receive input selecting a hide none view filter; and
in response to receiving the input, display mapped and unmapped source objects and target objects.

20. The article of manufacture of claim 16, wherein the article of manufacture is further operable to:
receive input from a user selecting a hide mapped view filter, wherein the user does not select source objects and target objects; and
in response to receiving the input, hide mapped source objects and target objects.

21. The article of manufacture of claim 16, wherein the article of manufacture is further operable to:
receive input from a user selecting a hide unmapped view filter, wherein the user does not select source objects and target objects;
in response to receiving the input, hide unmapped source objects and target objects.

22. The article of manufacture of claim 15, wherein at least one of the source area and the target area includes a hierarchical structure of nodes and wherein the article of manufacture is further operable to:
receive selection of one or more nodes;
receive input selecting a show only option; and
in response to receiving the input, hide one or more unselected nodes along with ancestors and descendants of the unselected nodes.

23. The article of manufacture of claim 15, wherein the at least one of the source area and the target area includes a hierarchical structure of nodes and wherein the article of manufacture is further operable to:
receive selection of one or more nodes;
receive input selecting a hide option; and
in response to receiving the input, hide the one or more selected nodes and ancestors and descendants of the selected one or more nodes.

24. The article of manufacture of claim 15, wherein at least one of the source area and the target area includes a hierarchical structure of nodes and wherein the article of manufacture is further operable to:
receiving input selecting a restore option, wherein the restore option restores nodes hidden a step at a time based on previous selections of a hide option or a show only option; and
in response to receiving the input, display nodes hidden by a single previous selection of a show only or hide option.

25. The article of manufacture of claim 15, wherein at least one of the source area and the target area includes a hierarchical structure of nodes and wherein the article of manufacture is further operable to:
receive input selecting a restore all option; and
in response to receiving the input, display nodes hidden by each previous selection of a show only or hide option.

26. The article of manufacture of claim 16, wherein the one or more source objects are displayed in the source area and the one or more target objects are displayed in the target area.

27. A system for viewing mappings between objects, comprising:
hardware logic causing operations to be performed, the operations comprising:
displaying on a single screen a navigator view that lists files available at the computer, an outline view that provides textual information about mappings, a properties view that provides information about a currently selected table, and a main view that shows one of an overview that shows mappings between source tables and target tables, a detail view that shows column mappings, and a single mapping group view that shows column mappings, wherein each type of view provides a different amount of detail regarding mappings, wherein the main view includes a source area, a middle area, and a target area;
receiving input selecting the type of view to be displayed in the main view; and
in response to receiving the input,
creating the selected type of; and
displaying the created view by:
in response to receiving the selection of the overview using a pull-down menu, displaying the source tables without displaying source columns, displaying the target tables without displaying the target columns, and displaying the mappings between the source tables and the target tables;
in response to receiving the selection of the detail view using the pull-down menu, displaying the source tables and the source columns, displaying the target tables and the target columns, and displaying column mappings between the source columns and the target columns; and
in response to receiving selection of the single mapping group view using the pull-down menu, displaying one source table and the source columns of the one source table, displaying one target table and the target columns of the one target table, and displaying column mappings between the source columns of the one source table and the target columns of the one target table.

28. An article of manufacture for viewing objects, wherein the article of manufacture comprises a computer readable storage medium storing program instructions, and wherein the program instructions, when executed on a processor of a computer, are operable to:
display source tables and target tables along with mappings between some of the source tables and the target tables;
provide view filters of hide unmapped and hide mapped that are to be applied to the displayed source tables and the displayed target tables;
receive input from a user selecting a view filter from one of the source area, the middle area, and the target area without selecting any of the source tables and the target tables, wherein the view filter is applied to the source tables when the view filter is selected in the source area, wherein the view filter is applied to the source tables and to the target tables when selected in the middle area, and wherein the view filter is applied to the target tables when selected form the target area;
in response to receiving input from the user selecting a hide mapped view filter, hide the source tables and the target tables that have already been mapped to other tables based on whether the hide mapped view filter was selected in the source area, the middle area or the target area; and
in response to receiving input from a user selecting a hide unmapped view filter, hide the source tables and the target tables that have not already been mapped to other tables based on whether the hide unmapped view filter was selected in the source area, the middle area or the target area.

29. The article of manufacture of claim 28, wherein the article of manufacture is further operable to:
receive input selecting a hide none view filter; and
in response to receiving the input, display mapped and unmapped source objects and target objects.

30. A system for viewing objects, comprising:
hardware logic causing operations to be performed, the operations comprising:
displaying source tables and target tables along with mappings between some of the source tables and the target tables;
providing view filters of hide unmapped and hide mapped that are to be applied to the displayed source tables and the displayed target tables;
receiving input from a user selecting a view filter from one of the source area, the middle area, and the target area without selecting any of the source tables and the target tables, wherein the view filter is applied to the source tables when the view filter is selected in the source area, wherein the view filter is applied to the source tables and to the target tables when selected in the middle area, and wherein the view filter is applied to the target tables when selected form the target area;
in response to receiving input from the user selecting a hide mapped view filter, hiding the source tables and the target tables that have already been mapped to other tables based on whether the hide mapped view filter was selected in the source area, the middle area or the target area; and
in response to receiving input from a user selecting a hide unmapped view filter, hiding the source tables and the target tables that have not already been mapped to other tables based on whether the hide unmapped view filter was selected in the source area, the middle area or the target area.

* * * * *